(12) United States Patent
Naruse et al.

(10) Patent No.: US 11,148,043 B2
(45) Date of Patent: Oct. 19, 2021

(54) PERIPHERAL APPARATUS, GAME CONTROLLER, INFORMATION PROCESSING SYSTEM, AND INFORMATION PROCESSING METHOD

(71) Applicant: NINTENDO CO., LTD., Kyoto (JP)

(72) Inventors: Fumisato Naruse, Kyoto (JP); Shumpei Yasuda, Kyoto (JP); Toshiki Oizumi, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 203 days.

(21) Appl. No.: 16/708,858

(22) Filed: Dec. 10, 2019

(65) Prior Publication Data

US 2021/0060415 A1 Mar. 4, 2021

(30) Foreign Application Priority Data

Aug. 30, 2019 (JP) .............................. JP2019-157827

(51) Int. Cl.
*A63F 13/235* (2014.01)
*A63F 13/24* (2014.01)
(Continued)

(52) U.S. Cl.
CPC ............ *A63F 13/235* (2014.09); *A63F 13/24* (2014.09); *A63F 13/42* (2014.09); *A63F 13/493* (2014.09); *A63F 2300/204* (2013.01)

(58) Field of Classification Search
CPC ........ A63F 13/235; A63F 13/24; A63F 13/42; A63F 13/493; A63F 2300/204
(Continued)

(56) References Cited

U.S. PATENT DOCUMENTS 7,942,745 B2 * 5/2011 Ikeda ...................... A63F 13/24
463/38
8,535,132 B2 * 9/2013 Shimamura ............. A63F 13/10
463/2

(Continued)

FOREIGN PATENT DOCUMENTS

EP 0 940 162 A1 9/1999
EP 1 757 345 2/2007
(Continued)

OTHER PUBLICATIONS

"New arrival of the attachment for enjoying smartphone game with PlayStation Controller", Excite News [online], Aug. 6, 2014, searched on Nov. 25, 2019, URL, https://www.excite.co.jp/news/article/Androidsmart_80348/ (3 pgs.).

(Continued)

*Primary Examiner* — Allen Chan
(74) *Attorney, Agent, or Firm* — Nixon & Vanderhye PC

(57) ABSTRACT

An example peripheral apparatus is configured to communicate with a game controller configured to control a game apparatus. The peripheral apparatus includes a sensor configured to detect a user input, a processor and a transmitter. The peripheral apparatus is configured to operate in one of a plurality of modes including a first mode and a second mode while a communication connection between the peripheral apparatus and the game controller is established. In the first mode, the processor generates a command configured to cause the game controller to execute an operation based on peripheral apparatus data in accordance with a user input detected by the sensor, and the transmitter transmits the command to the game controller. In the second mode, the transmitter transmits the peripheral apparatus data to the game controller.

34 Claims, 16 Drawing Sheets

(51) Int. Cl.
*A63F 13/42* (2014.01)
*A63F 13/493* (2014.01)

(58) Field of Classification Search
USPC .......................................................... 463/39
See application file for complete search history.

(56) References Cited

U.S. PATENT DOCUMENTS

| | | | |
|---|---|---|---|
| 9,895,606 B1* | 2/2018 | Kamata | A63F 13/285 |
| 10,143,921 B1 | 12/2018 | Strahle | |
| 10,335,674 B1 | 7/2019 | Trenado et al. | |
| 10,967,251 B2* | 4/2021 | Sakaguchi | A63F 13/25 |
| 2002/0111216 A1 | 8/2002 | Himoto et al. | |
| 2005/0119053 A1 | 6/2005 | Suzuki et al. | |
| 2008/0015017 A1 | 1/2008 | Ashida et al. | |
| 2008/0146336 A1 | 6/2008 | Feldman et al. | |
| 2010/0262718 A1 | 10/2010 | Ikeno et al. | |
| 2011/0130203 A1 | 6/2011 | Reiss et al. | |
| 2011/0190052 A1 | 8/2011 | Takeda et al. | |
| 2011/0263328 A1 | 10/2011 | Yamashita et al. | |
| 2012/0137024 A1* | 5/2012 | Kim | G06F 1/1632 710/8 |
| 2016/0231773 A1* | 8/2016 | Inoue | A63F 13/24 |
| 2018/0028913 A1* | 2/2018 | Onozawa | A63F 13/211 |
| 2019/0192962 A1* | 6/2019 | Kasuno | A63F 13/235 |

FOREIGN PATENT DOCUMENTS

| | | |
|---|---|---|
| EP | 2 130 570 | 12/2009 |
| EP | 2 397 198 | 12/2011 |
| EP | 2 486 964 | 8/2012 |
| EP | 3 103 532 | 12/2016 |
| EP | 3 208 693 | 8/2017 |
| EP | 3 399 387 | 11/2018 |
| EP | 3 508 261 | 7/2019 |
| JP | 11-57213 | 3/1999 |
| JP | 2002-123353 | 4/2002 |
| JP | 2004-267476 | 9/2004 |
| JP | 2005-152508 | 6/2005 |
| JP | 2011-227804 | 11/2011 |
| WO | 99/08231 | 2/1999 |
| WO | 2016/176003 | 11/2016 |

OTHER PUBLICATIONS

Notice of Reasons for Refusal dated Dec. 10, 2019 in Japanese Patent Application No. 2019-157827 (4 pgs.) with English machine translation (2 pgs.).

Extended European Search Report issued in EP Application No. 19214937.5, dated Jul. 1, 2020 (14 pages).

* cited by examiner

PERIPHERAL APPARATUS, GAME CONTROLLER, INFORMATION PROCESSING SYSTEM, AND INFORMATION PROCESSING METHOD

CROSS REFERENCE TO RELATED APPLICATION

The disclosure of Japanese Patent Application No. 2019-157827 filed on Aug. 30, 2019 is incorporated herein by reference.

FIELD

The present technology relates to a game controller or a peripheral apparatus connectable thereto.

BACKGROUND AND SUMMARY

There are conventional peripheral apparatuses connectable to game controllers.

It may be possible to realize various functions by increasing types of peripheral apparatuses connectable to game controllers, and by connecting such various peripheral apparatuses to game controllers. Herein, when introducing a new type of a peripheral apparatus connectable to a game controller, there may be a need to make a change to the game controller so as to be compatible with the new peripheral apparatus. There is room for improvement with conventional game controllers and conventional peripheral apparatuses to minimize the need to make such changes and so that it is easy for game controllers to be compatible with peripheral apparatuses.

Thus, the present application discloses a peripheral apparatus, a game controller, an information processing system and an information processing method, with which the game controller can be a general-purpose game controller that is easily compatible with peripheral apparatuses.

(1)

An example peripheral apparatus described herein is configured to communicate with a game controller configured to control a game apparatus. The peripheral apparatus includes a sensor configured to detect a user input, a processor and a transmitter. The peripheral apparatus is capable of operating in one of a plurality of modes including a first mode and a second mode while a communication connection between the peripheral apparatus and the game controller is established. In the first mode, the processor generates a command configured to cause the game controller to execute an operation based on peripheral apparatus data in accordance with a user input detected by the sensor; and the transmitter transmits the command to the game controller. In the second mode, the transmitter transmits the peripheral apparatus data to the game controller.

With configuration (1) above, in the first mode, the game controller can operate in accordance with a command from the peripheral apparatus. Therefore, the process of the game controller in the first mode can be a general-purpose process for different peripheral apparatuses. Thus, the game controller can be a general-purpose game controller that is easily compatible with different peripheral apparatuses.

(2)

Another example peripheral apparatus described herein is configured to communicate with a game controller configured to control a game apparatus. The peripheral apparatus includes a processor and a transmitter. The peripheral apparatus is capable of operating in one of a plurality of modes including a first mode and a second mode while a communication connection between the peripheral apparatus and the game controller is established. In the first mode, the transmitter transmits a transmission request signal to the game controller. In the first mode, the processor executes a process based on controller data in accordance with a user input to the game controller, wherein the controller data is transmitted from the game controller in response to the game controller receiving the transmission request signal. In the second mode, in response to a transmission request signal from the game controller, the transmitter transmits, to the game controller, peripheral apparatus data obtained or generated by the peripheral apparatus.

With configuration (2) above, in the first mode, the process based on an input to the game controller can be executed on the side of the peripheral apparatus having received the controller data. Thus, the game controller can be a general-purpose game controller that is easily compatible with different peripheral apparatuses.

(3)

In the first mode, a process based on a user input to the game controller and/or the peripheral apparatus may be executed by the peripheral apparatus and the game controller without the game apparatus. In the second mode, data based on the peripheral apparatus data may be transmitted from the game controller to the game apparatus, and a process based on the transmitted data is executed by the game apparatus.

With configuration (3) above, as the game controller and the peripheral apparatus operate in the first mode, processes can be executed even during the period in which no application is being executed on the game apparatus. Therefore, the user can used the game controller and the peripheral apparatus even during the period in which no application is being executed on the game apparatus.

(4)

In the first mode, the peripheral apparatus may receive, from the game controller, controller data in accordance with a user input to the game controller.

With configuration (4) above, a process based on a user input to the game controller can be executed on the peripheral apparatus side.

(5)

In the first mode, the processor may generate, based on the controller data, a command configured to cause the game controller to execute an operation; and the transmitter may transmit the command to the game controller.

With configuration (5) above, a process for causing the game controller to execute an operation can be executed on the peripheral apparatus side.

(6)

The peripheral apparatus may receive, from the game controller, controller data for all operable ones of buttons of the game controller.

(7)

The transmitter may transmit, to the game controller, the command, which is based on a portion of the controller data and not on the other portion of the controller data.

With configuration (6) or (7) above, the peripheral apparatus can execute processes based on inputs to operable buttons of the game controller. Even if there are a plurality of types of peripheral apparatuses compatible for the game controller, since the content of the controller data to be transmitted to the peripheral apparatus from the game controller can be made common between different peripheral apparatuses, the process on the game controller can be a general-purpose process.

(8)

The game controller may include a wake button. When an input on the wake button is detected while a communication connection between the game controller and the peripheral apparatus is not established in a state that is at least different from a state of operating in the first mode, the game controller may transmit, to the game apparatus, a signal configured to cause the game apparatus to resume from a sleep mode. The transmission is not based on the command from the peripheral apparatus. In the first mode, when the peripheral apparatus receives controller data that is transmitted in response to an input on the wake button having been performed, the processor may generate a command instructing to transmit, to the game apparatus, a signal configured to cause the game apparatus to resume from the sleep mode, and the transmitter may transmit the command to the game controller.

With configuration (8) above, the behavior in response to an input to the wake button is the same between two modes different from each other in terms of the flow of processes on the game controller and the peripheral apparatus.

(9)

The peripheral apparatus may be electrically connectable to the game controller and may be configured to be powered by power supplied from the game controller electrically connected to the peripheral apparatus. When the peripheral apparatus starts up based on power supplied from the game controller, the peripheral apparatus may enter a stand-by state waiting for receiving, from the game controller, mode information indicating one of the plurality of modes in which the peripheral apparatus should operate. The peripheral apparatus may operate in the mode indicated by the mode information received from the game controller in the stand-by state.

With configuration (9) above, after the power supply from the game controller is started, the peripheral apparatus can operate in an appropriate mode.

(10)

The peripheral apparatus may include an electronic component that is a part of a circuit formed through electrical connection between the game controller and the peripheral apparatus and has a resistance value.

With configuration (10) above, the game controller can determine the information (e.g., the type) of the peripheral apparatus by detecting the resistance value of the circuit.

(11)

In the first mode, when the peripheral apparatus receives controller data that is transmitted in response to an input using the game controller having been performed, the transmitter may transmit an end signal representing an end of the first mode to the game controller.

With configuration (11) above, since the peripheral apparatus can end the independent operation mode at an appropriate timing after the completion of the process on the peripheral apparatus, it is possible to reduce the possibility of discontinuing an unfinished process on the peripheral apparatus when ending the independent operation mode.

(12)

The peripheral apparatus may include a storage medium configured to store the number of user inputs detected by the sensor in the first mode.

With configuration (12) above, the number of user inputs that have been made while in the first mode can be stored.

(13)

An example game controller described herein is configured to control a game apparatus and configured to communicate with a peripheral apparatus, the game controller including an operation section and a transmitter. The game controller is capable of operating in one of a plurality of modes including a first mode and a second mode while a communication connection between the game controller and the peripheral apparatus is established. In the first mode, the transmitter transmits, to the peripheral apparatus, controller data in accordance with a user input to the operation section. In the second mode, the transmitter transmits, to the game apparatus, controller data in accordance with a user input to the operation section.

With configuration (13) above, in the first mode, a process based on a user input to the game controller can be executed on the peripheral apparatus side. Then, the process of the game controller in the first mode is a general-purpose process for different peripheral apparatuses. Thus, the game controller can be a general-purpose game controller that is easily compatible with different peripheral apparatuses.

(14)

In the first mode, a process based on a user input to the game controller and/or the peripheral apparatus may be executed by the peripheral apparatus and the game controller without the game apparatus. In the second mode, a process based on the controller data transmitted to the game apparatus may be executed by the game apparatus.

With configuration (14) above, as with configuration (3) above, the game controller and the peripheral apparatus can execute processes even during the period in which no application is being executed on the game apparatus.

(15)

In the first mode, the game controller may receive, from the peripheral apparatus, a command in accordance with controller data transmitted to the peripheral apparatus, and operates in response to the command. In the second mode, the game controller may receive, from the game apparatus, a command in response to controller data transmitted to the game apparatus, and operates in response to the command.

With configuration (15) above, since the game controller operates in accordance with a command from another apparatus either in the first mode or in the second mode, it is possible to simplify the process on the game controller.

(16)

The operation device may include buttons. The transmitter may transmit, to the peripheral apparatus, controller data for all operable ones of buttons of the game controller.

With configuration (16) above, as with configuration (6) above, the peripheral apparatus can execute processes based on inputs to operable buttons of the game controller, and the process on the game controller can be a general-purpose process.

(17)

The game controller may include a wake button. When an input on the wake button is detected while a communication connection between the game controller and the peripheral apparatus is not established in a state that is at least different from a state of operating in the first mode, the game controller may transmit, to the game apparatus, a signal configured to cause the game apparatus to resume from a sleep mode. The transmission is not based on a command from the peripheral apparatus. In response to the wake button being pressed in the first mode, the game controller may transmit, to the peripheral apparatus, controller data that is transmitted in response to the wake button having been pressed. In response to receiving a command in accordance with the controller data from the peripheral apparatus, the game controller may transmit, to the game apparatus, a signal configured to cause the game apparatus to resume from the sleep mode.

With configuration (17) above, as with configuration (8) above, the behavior in response to an input to the wake button is the same between two modes different from each other in terms of the flow of processes on the game controller and the peripheral apparatus.

(18)

When a resistance value of a circuit that is formed through electrical connection between the game controller and the peripheral apparatus is within a first range, the game controller may be capable of operating in the first mode and may be capable of operating in the second mode. When the resistance value of the circuit that is formed through electrical connection between the game controller and the peripheral apparatus is within a second range different from the first range, the game controller may be capable of operating in the second mode and not in the first mode.

With configuration (18) above, it is possible to prevent the game controller from erroneously operating in the first mode when a peripheral apparatus that is not compatible with the first mode and the game controller are electrically connected to each other.

(19)

The game controller may operate in the first mode, at least on the condition that the resistance value of the circuit that is formed through electrical connection between the game controller and the peripheral apparatus is within the first range, in response to detection of an input using the game controller in a state where the game controller is electrically connected to the peripheral apparatus and a wireless connection with the game apparatus has not been established.

With configuration (19) above, it is possible to cause the game controller to start the first mode at a timing in response to an input by the user.

(20)

At least on the condition that the resistance value of the circuit formed through electrical connection between the game controller and the peripheral apparatus is within the first range, the game controller may supply power to other parts of the peripheral apparatus different from a part thereof that forms the circuit.

With configuration (20) above, it is possible to prevent the game controller from erroneously supplying power to a peripheral apparatus that does not need to receive power supply.

(21)

When the game controller operates in the first mode, the processor may generate mode information representing an operation in the first mode, and the transmitter may transmit the mode information to the peripheral apparatus.

With configuration (21) above, the game controller can cause the peripheral apparatus to operate in a mode appropriate for the mode in which the game controller is operating.

Note that the present specification also discloses an information processing system including a peripheral apparatus and a game controller set forth in (1) to (21) above. The present specification also discloses an information processing method to be executed on the information processing system. The present specification also discloses an information processing program to be executed on the peripheral apparatus or the game controller.

With the peripheral apparatus, the game controller, the information processing system and the information processing method set forth above, the game controller can be a general-purpose game controller that is easily compatible with different peripheral apparatuses.

These and other objects, features, aspects and advantages will become more apparent from the following detailed description when taken in conjunction with the accompanying drawings.

DETAILED DESCRIPTION OF NON-LIMITING EXAMPLE EMBODIMENTS

1. Configuration of Game System

Figure 1:
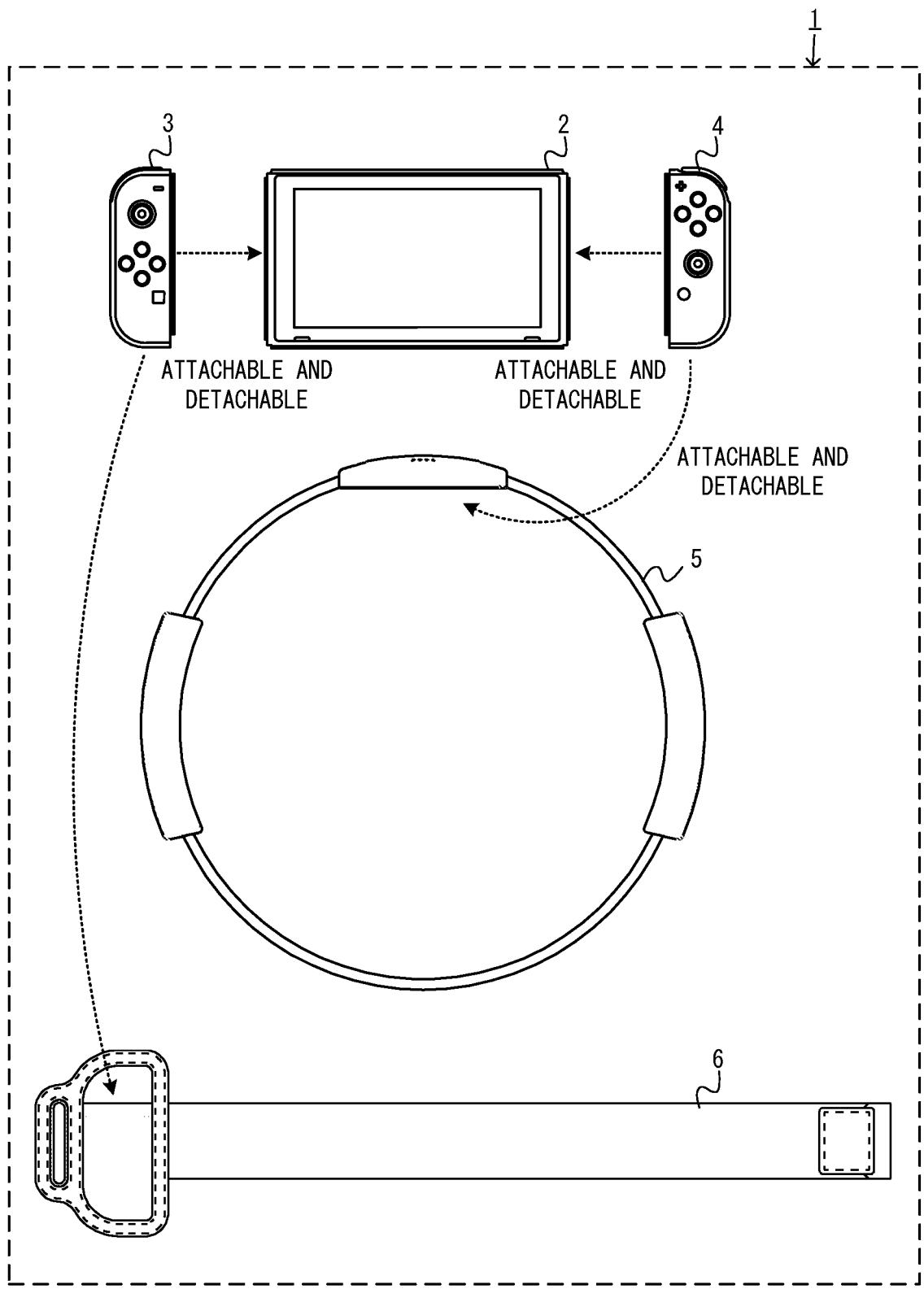
FIG. 1 is a diagram showing an example of a non-limiting apparatuses included in a game system.

A game system according to an example of the present embodiment will now be described. FIG. 1 is a diagram showing an example of apparatuses included in the game system. As shown in FIG. 1, a game system 1 includes a main body apparatus 2, a left controller 3, a right controller 4, and a ring-shaped extension apparatus 5.

The main body apparatus 2 is an example of an information processing apparatus, and functions as a game device main body in the present embodiment. The left controller 3 and the right controller 4 are attachable to and detachable from the main body apparatus 2 (see FIG. 1 and FIG. 3). That is, the user can attach the left controller 3 and the right controller 4 to the main body apparatus 2, and use them as a unified apparatus (see FIG. 2). The user can also use the main body apparatus 2 and the left controller 3 and the right controller 4 separately from each other (see FIG. 3). Note that the main body apparatus 2 and the controllers 3 and 4 may hereinafter be referred to collectively as a "game apparatus".

The ring-shaped extension apparatus 5 is an example of an extension apparatus that is used with the right controller 4. The ring-shaped extension apparatus 5 is used with the right controller 4 attached thereto. Thus, in the present embodiment, the user can use the right controller 4 while it is attached to the ring-shaped extension apparatus 5 (see FIG. 10). Note that the ring-shaped extension apparatus 5 is not limited for use with the right controller 4, but the left controller 3 may be attachable thereto.

[1-1. Configuration of Game Apparatus]

Figure 2:
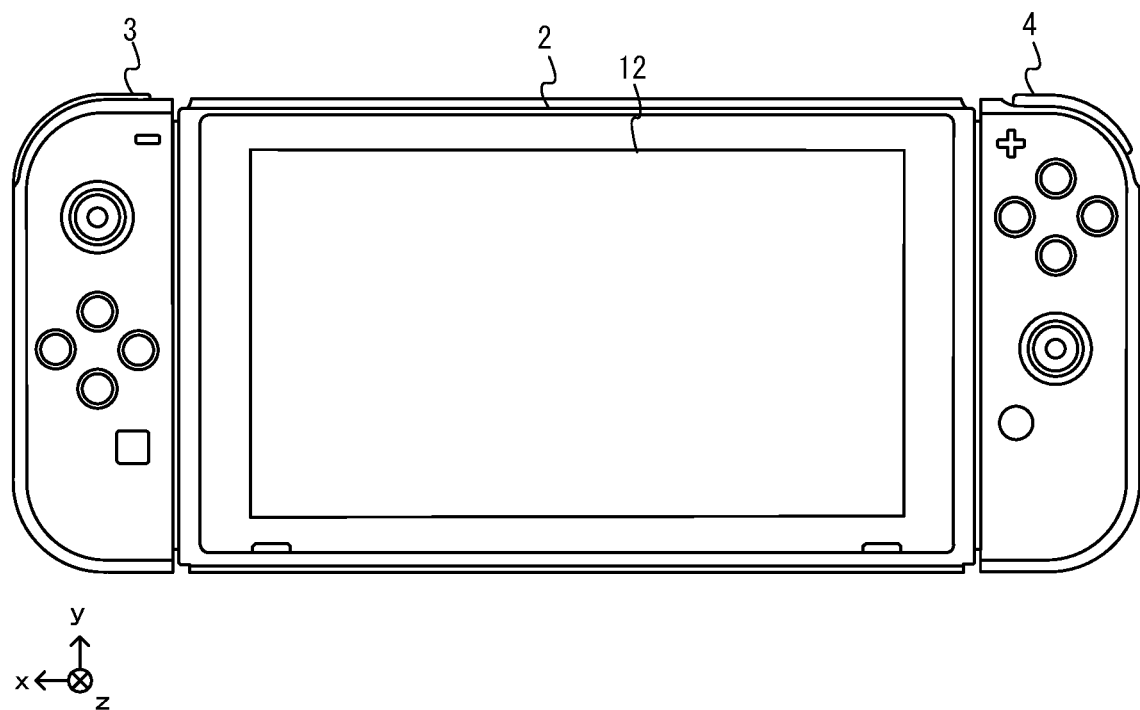
FIG. 2 is a diagram showing an example of a state where a non-limiting left controller and a non-limiting right controller are attached to a non-limiting main body apparatus.

FIG. 2 is a diagram showing an example of the state where the left controller 3 and the right controller 4 are attached to the main body apparatus 2. As shown in FIG. 2, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 3:
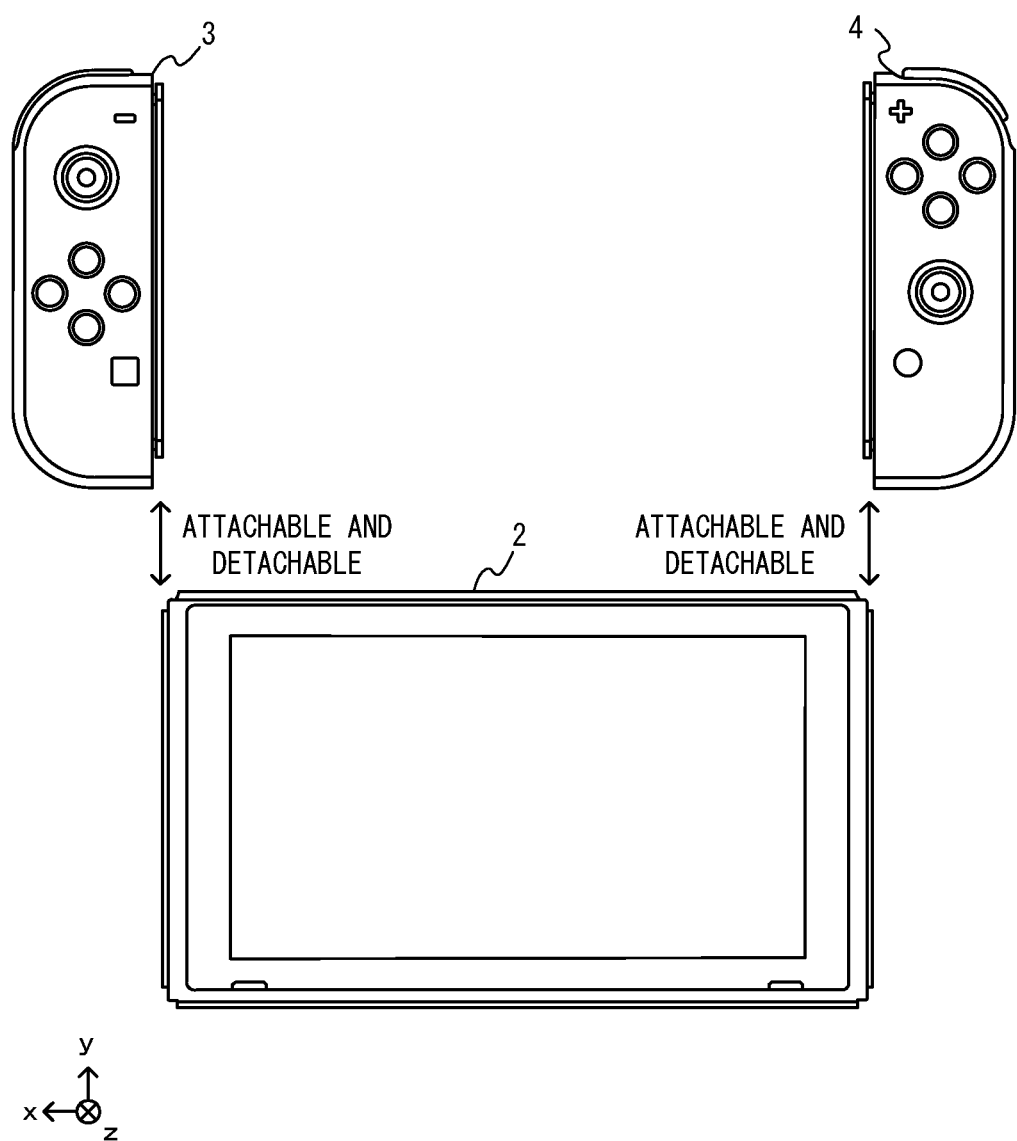
FIG. 3 is a diagram showing a state where a non-limiting left controller and a non-limiting right controller are detached from a non-limiting main body apparatus.

FIG. 3 is a diagram showing an example of the state where each of the left controller 3 and the right controller 4 is detached from the main body apparatus 2. As shown in FIGS. 2 and 3, the left controller 3 and the right controller 4 are attachable to and detachable from the main body apparatus 2. It should be noted that hereinafter, the left controller 3 and the right controller 4 will occasionally be referred to collectively as a "controller".

Figure 4:
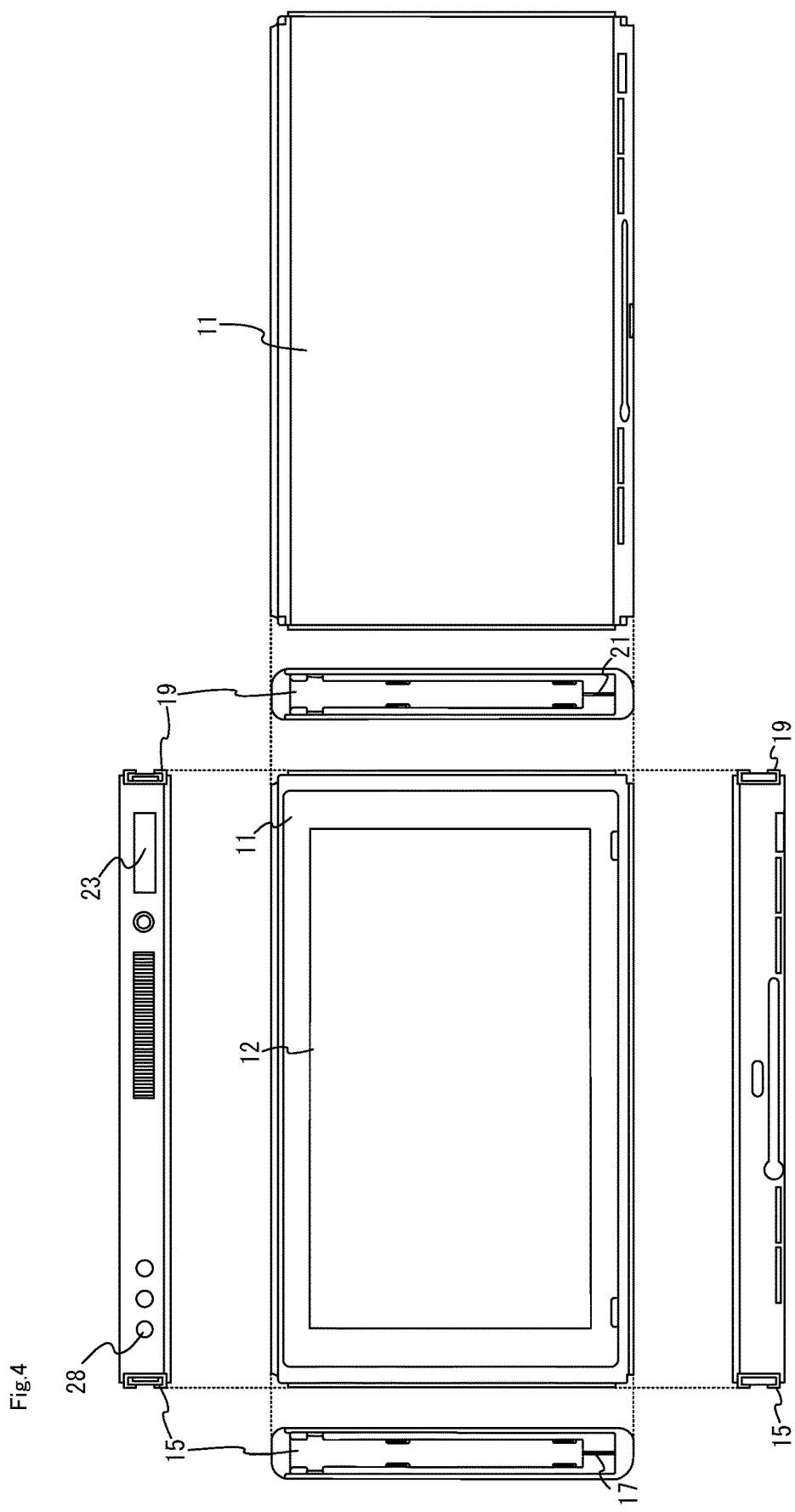
FIG. 4 is six orthogonal views showing an example of a non-limiting main body apparatus.

FIG. 4 is six orthogonal views showing an example of the main body apparatus 2. As shown in FIG. 4, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

As shown in FIG. 4, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type. Note that the main body apparatus 2 may output the image to an external monitor.

The main body apparatus 2 includes speakers within the housing 11. As shown in FIG. 4, speaker holes 11a and 11b are formed on the main surface of the housing 11. Then, sounds output from the speakers are output through the speaker holes 11a and 11b.

The main body apparatus 2 includes a left-side terminal 17 that enables wired communication between the main body apparatus 2 and the left controller 3, and a right-side terminal 21 that enables wired communication between the main body apparatus 2 and the right controller 4.

As shown in FIG. 4, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 5:
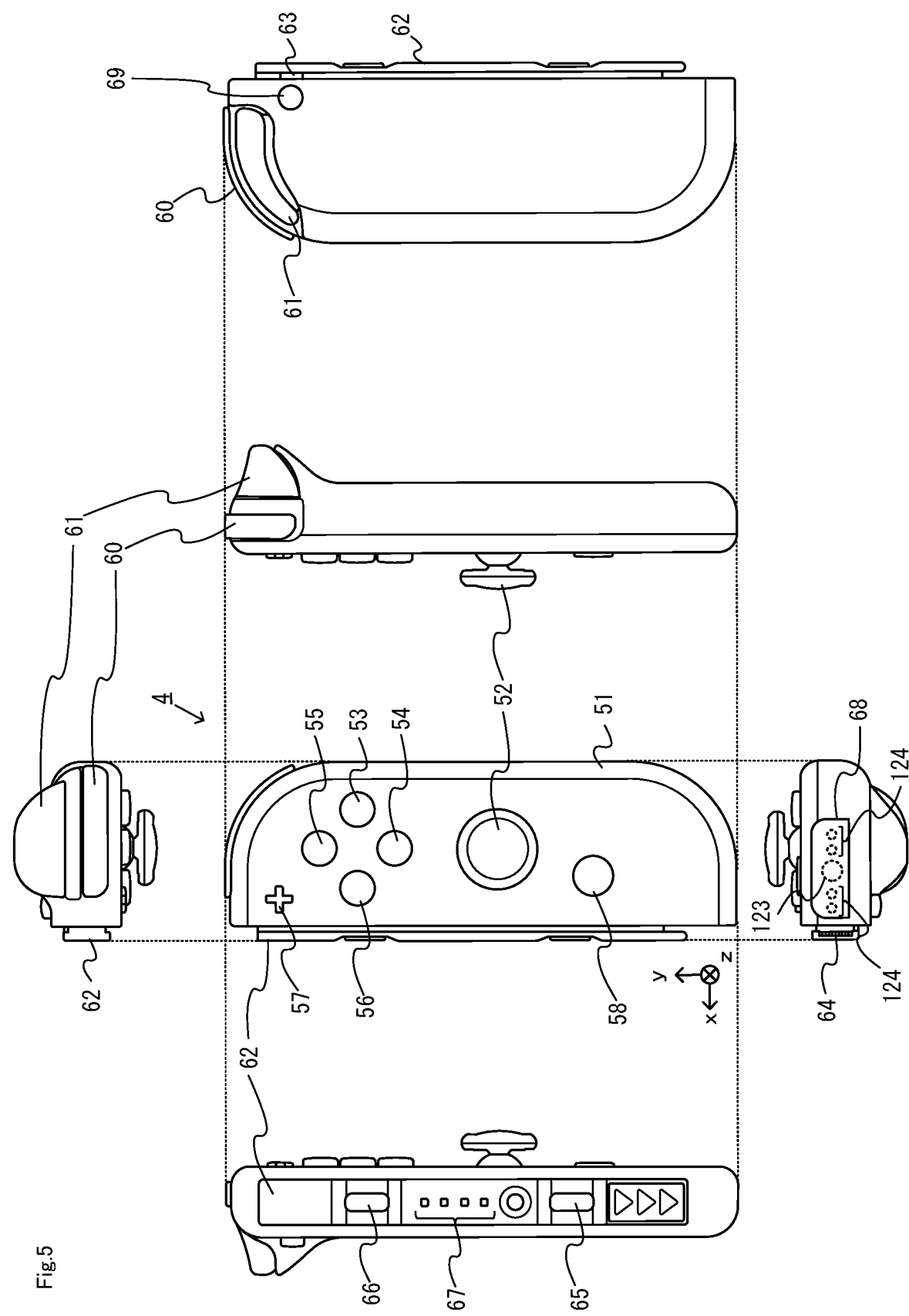
FIG. 5 is six orthogonal views showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, e.g., is shaped to be long in the up-down direction (i.e., a y-axis direction shown in FIG. 5). In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

The right controller 4 includes an analog stick 52 as a direction input section. As shown in FIG. 5, the analog stick 52 is provided on a main surface of the housing 51. The user tilts a shaft portion of the analog stick 52 and thereby can input a direction corresponding to the direction of the tilt (and input a magnitude corresponding to the angle of the tilt). It should be noted that the right controller 4 may include a directional pad, a slide stick that allows a slide input, or the like as the direction input section, instead of the analog stick. Further, in the exemplary embodiment, it is possible to provide an input by pressing the analog stick 52.

The right controller 4 includes various operation buttons. The right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, the right controller 4 includes a second L-button 65 and a second R-button 66, on the side surface of the housing 51 on which the right controller 4 is attached to the main body apparatus 2. These operation buttons are used to give instructions depending on various programs (e.g., an OS program and an application program) executed by the main body apparatus 2.

The right controller 4 includes a terminal 64 that enables wired communication between the right controller 4 and the main body apparatus 2.

As shown in FIG. 5, the right controller 4 includes indicator LEDs 67. The indicator LEDs 67 are an indicator section for notifying the user of predetermined information. The indicator LEDs 67 are provided on the slider 62, specifically, on the engaging surface of the slider 62 (i.e., the surface that faces the x-axis positive direction side shown in FIG. 5). In the present embodiment, the right controller 4 includes four LEDs as the indicator LEDs 67. For example, the predetermined information includes a number that is assigned by the main body apparatus 2 to the right controller 4, and information relating to the remaining battery level of the right controller 4.

Note that as does the right controller 4, the left controller 3 also includes four indicator LEDs 45 (see FIG. 5). The left controller 3 includes a terminal that enables wired communication between the left controller 3 and the main body apparatus 2.

Figure 6:
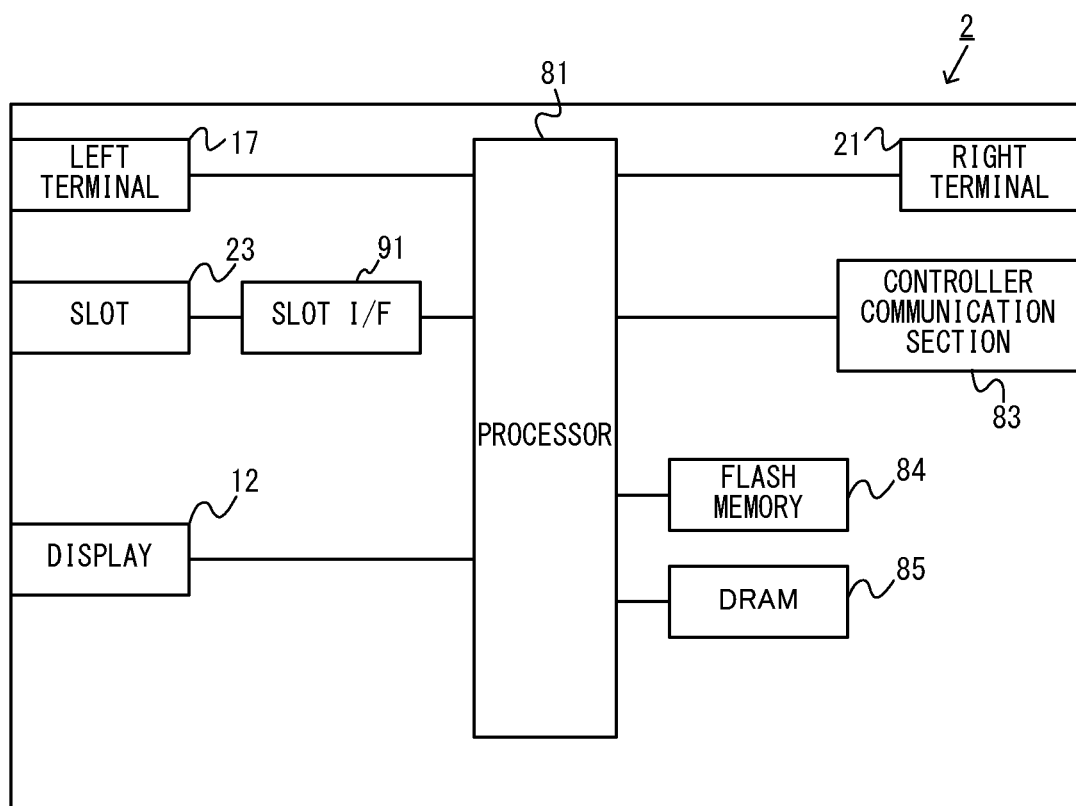
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81 to 91, 97, and 98 shown in FIG. 6 in addition to the components shown in FIG. 4. Some of the components 81 to 91, 97, and 98 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, a processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage medium (e.g., an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot I/F 91 is connected to the processor 81. The slot I/F 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, a controller communication section 83 performs communication compliant with the Bluetooth (registered trademark) standard with the left controller 3 and with the right controller 4.

Further, the display 12 is connected to the processor 81. The processor 81 displays a generated image (e.g., an image generated by executing the above information processing) and/or an externally acquired image on the display 12.

Figure 7:
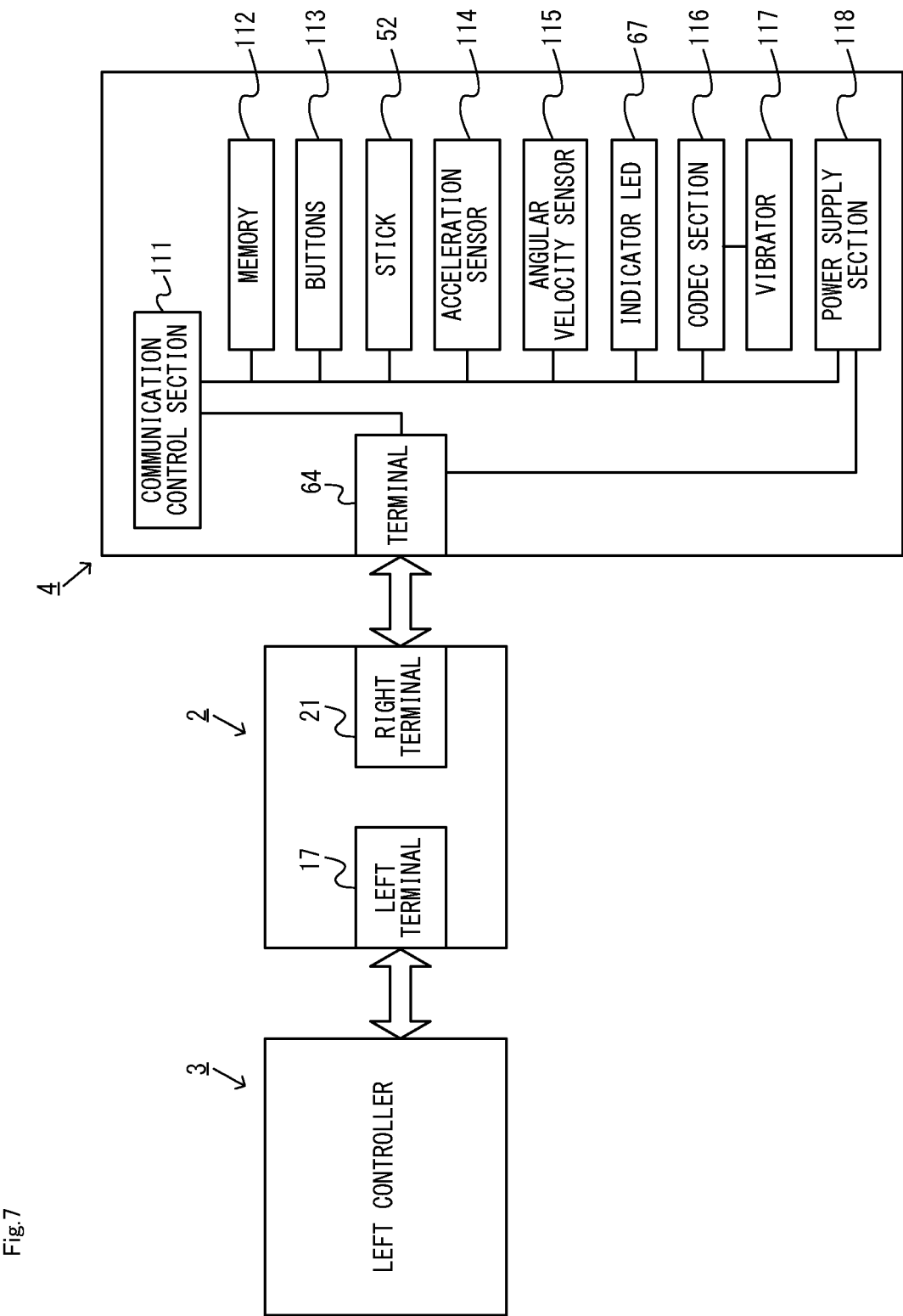
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The right controller 4 includes a communication control section 111, which communicates with the main body apparatus 2. As shown in FIG. 7, a communication control section 111 is connected to components including the terminal 64. In the exemplary embodiment, the communication control section 111 can communicate with the main body apparatus 2 through both wired communication via a terminal 64 and wireless communication not via the terminal 64. The communication control section 111 controls the method for communication performed by the right controller 4 with the main body apparatus 2. That is, when the right controller 4 is attached to the main body apparatus 2, the communication control section 111 communicates with the main body apparatus 2 via the terminal 64. Further, when the right controller 4 is detached from the main body apparatus 2, the communication control section 111 wirelessly communicates with the main body apparatus 2 (specifically, the controller communication section 83). The wireless communication between the communication control section 111 and the controller communication section 83 is performed in accordance with the Bluetooth (registered trademark) standard, for example.

Further, the right controller 4 includes a memory 112 such as a flash memory. The communication control section 111 includes, for example, a microcomputer (or a microprocessor) and executes firmware stored in the memory 112, thereby performing various processes.

The right controller 4 includes buttons 103 (specifically, the buttons 53 to 58, 60, 61, 65, and 66). Further, the right controller 4 includes the analog stick ("stick" in FIG. 7) 52. Each of the buttons 113 and the analog stick 52 outputs information regarding an input performed on itself to the communication control section 111 repeatedly at appropriate timing.

The right controller 4 includes inertial sensors. Specifically, the right controller 4 includes an acceleration sensor 114. Further, the right controller 4 includes an angular velocity sensor 115. In the exemplary embodiment, an acceleration sensor 114 detects the magnitudes of accelerations along predetermined three axial (e.g., xyz axes shown in FIG. 5) directions. It should be noted that the acceleration sensor 114 may detect an acceleration along one axial direction or accelerations along two axial directions. In the exemplary embodiment, an angular velocity sensor 115 detects angular velocities about predetermined three axes (e.g., the xyz axes shown in FIG. 5). It should be noted that the angular velocity sensor 115 may detect an angular velocity about one axis or angular velocities about two axes. Each of the acceleration sensor 114 and the angular velocity sensor 115 is connected to the communication control section 111. Then, the detection results of the acceleration sensor 114 and the angular velocity sensor 115 are output to the communication control section 111 repeatedly at appropriate timing.

The communication control section 111 acquires information regarding an input (e.g., information regarding an operation or the detection result of the sensor) from each of input sections (specifically, the buttons 113, the analog stick 52, and the sensors 114 and 115). The communication control section 111 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the right controller 4. That is, the main body apparatus 2 can determine inputs on the buttons 113 and the analog stick 52 based on the operation data. Further, the main body apparatus 2 can calculate information regarding the motion and/or the orientation of the right controller 4 based on the operation data (specifically, the detection results of the acceleration sensor 114 and the angular velocity sensor 115).

The right controller 4 includes a vibrator 117 for giving notification to the user by a vibration. In the exemplary embodiment, the vibrator 117 is controlled by a command from the main body apparatus 2. That is, if receiving the above command from the main body apparatus 2, the communication control section 111 drives the vibrator 117 in accordance with the received command. Here, the right controller 4 includes a codec section 116. If receiving the above command, the communication control section 111 outputs a control signal corresponding to the command to the codec section 116. The codec section 116 generates a driving signal for driving the vibrator 117 from the control signal from the communication control section 111 and outputs the driving signal to the vibrator 117. Consequently, the vibrator 117 operates. Note that in the present embodiment, the vibrator 117 is a voice coil motor. That is, the vibrator 117 is capable of generating a vibration in accordance with the signal input thereto and generating a sound in accordance with the signal. For example, when a signal of a frequency in the audible range is input to the vibrator 117, a vibration section 271 generates a vibration and generates a sound (i.e., an audible sound).

The right controller 4 includes a power supply section 118. In the exemplary embodiment, the power supply section 118 includes a battery and a power control circuit. Although not shown in FIG. 7, the power control circuit is connected to the battery and also connected to components of the right controller 4 (specifically, components that receive power supplied from the battery).

Note that although not shown in the figures, the left controller 3 includes like elements to those of the right controller 4 shown in FIG. 7.

[1-2. Configuration of Ring-Shaped Extension Apparatus]

Figure 8:
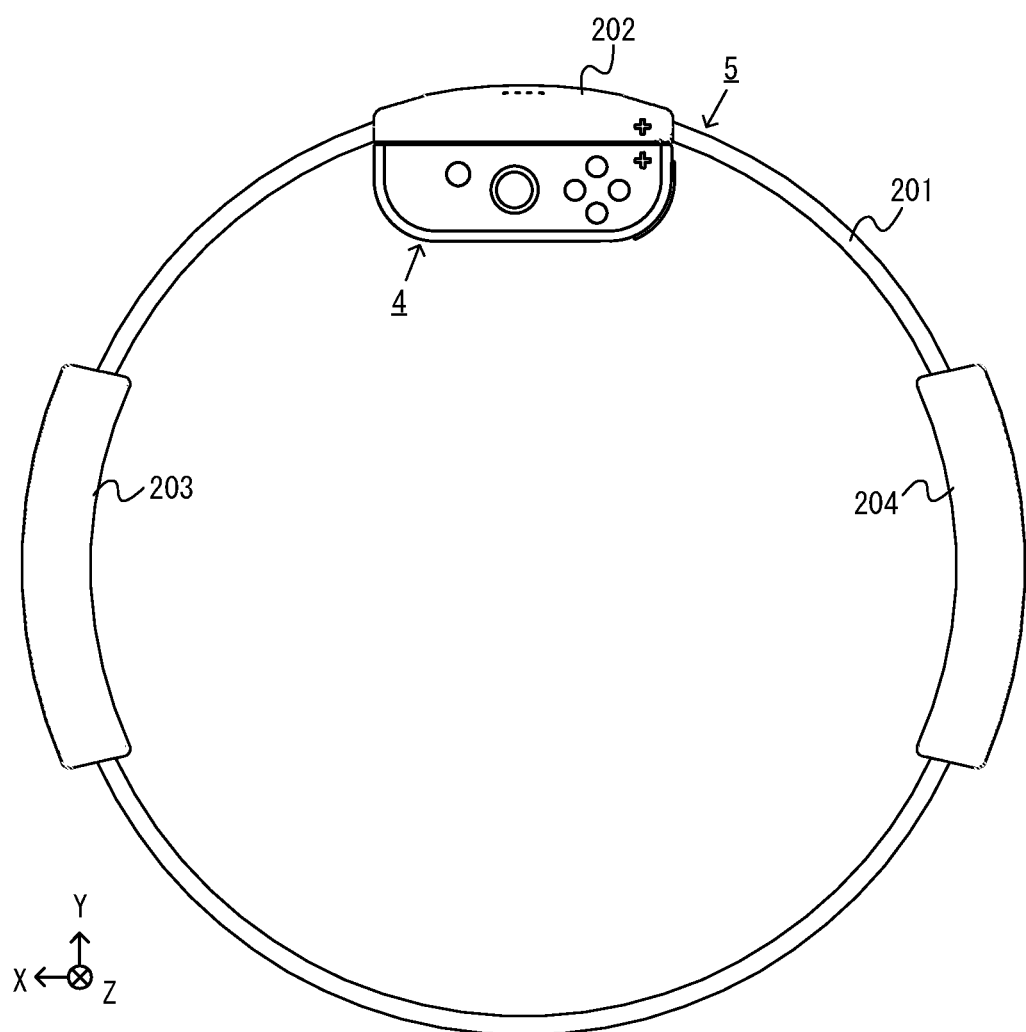
FIG. 8 is a diagram showing an example of a non-limiting ring-shaped extension apparatus 5.

FIG. 8 is a diagram showing an example of a ring-shaped extension apparatus. Note that FIG. 8 shows the ring-shaped extension apparatus 5 with the right controller 4 attached thereto. In the present embodiment, the ring-shaped extension apparatus 5 is an extension apparatus to which the right controller 4 can be attached. Although the details will be described later, the user performs a novel operation of applying a force to, and deforming, the ring-shaped extension apparatus 5 in the present embodiment. The user can operate the ring-shaped extension apparatus 5 by performing a fitness exercise operation using the ring-shaped extension apparatus 5 as if the user were doing an exercise, for example.

As shown in FIG. 8, the ring-shaped extension apparatus 5 includes a ring-shaped portion 201 and a main portion 202. The ring-shaped portion 201 has a ring shape. Note that in the present embodiment, the ring-shaped portion 201 includes an elastic member and a base portion and is formed in a ring shape. In the present embodiment, the ring-shaped portion 201 has a circular ring shape. Note that in other embodiments, the ring-shaped portion 201 may be of any shape, e.g., an elliptical ring shape.

The main portion 202 is provided on the ring-shaped portion 201. The main portion 202 includes a rail portion (not shown). The rail portion is an example of an attachment portion to which the right controller 4 can be attached. In the present embodiment, the rail portion slidably engages with the slider 62 of the right controller 4 (see FIG. 5). As the slider 62 is inserted into the rail member in a predetermined straight direction (i.e., the slide direction), the rail member engages with the slider 62 so that the slider 62 is slidable against the rail member in the straight direction. The rail portion is similar to the rail portion of the main body apparatus 2 in that it is slidably engageable with the slider of the controller. Therefore, the rail portion may have a similar configuration to that of the rail portion of the main body apparatus 2.

In the present embodiment, the direction parallel to the direction (referred to as the "front view direction") in which the ring formed by the ring-shaped portion 201 is viewed from front is the front-rear direction of the ring-shaped extension apparatus 5 (i.e., the Z-axis direction shown in FIG. 8). For example, "the direction in which the ring is viewed from front" is the direction from which the area of the shape represented by the outer edge of the ring appears largest. Where the ring is a circular ring, the "front view direction" can also be said to be the direction from which the ring appears circular.

The rail portion is provided on one side in the front-rear direction relative to the ring-shaped portion 201. Note that in the present embodiment, this side is denoted as the front side (in other words, the front near side) of the ring-shaped extension apparatus 5, and the opposite side thereto is denoted as the rear side (in other words, the back side) of the ring-shaped extension apparatus 5.

In the present embodiment, the right controller 4 includes a latch portion 63 (see FIG. 5). The latch portion 63 is provided so as to protrude sideways (i.e., the z-axis positive direction shown in FIG. 5) from the slider 62. While the latch portion 63 is allowed to move into the slider 62, the latch portion 63 is urged (e.g., by means of a spring) into the position described above in which the latch portion 63 is protruding sideways. The rail portion 211 is provided with a notch 219. The latch portion 63 engages with the notch 219 in a state where the slider 62 is inserted to the far end of the rail portion. As the latch portion 63 engages with the notch 219 while the rail portion is in engagement with the slider 62, the right controller 4 is attached to the main portion 202.

Note that the right controller 4 includes the release button 69 that can be pressed (see FIG. 5). In response to the release button 69 being pressed, the latch portion 63 moves into the slider 62, achieving the state where the latch portion 63 no longer (or substantially no longer) protrudes relative to the slider 62. Therefore, when the release button 69 is pressed in the state where the right controller 4 is attached to the main portion 202 of the ring-shaped extension apparatus 5, the latch portion 63 is no longer (or is substantially no longer) in engagement with the notch. Thus, in the state where the right controller 4 is attached to the main portion 202 of the ring-shaped extension apparatus 5, the user can easily remove the right controller 4 from the ring-shaped extension apparatus 5 by pressing the release button 69.

As shown in FIG. 8, the ring-shaped extension apparatus 5 includes grip covers 203 and 204. The grip covers 203 and 204 are components to be held by the user. In the present embodiment, with the provision of the grip covers 203 and 204, it is easier for the user to hold the ring-shaped extension apparatus 5. The details of the grip covers 203 and 204 will now be described.

As shown in FIG. 8, in the present embodiment, two grip covers 203 and 204 are provided on the ring-shaped portion 201. In the present embodiment, the grip covers 203 and 204 can be removed from the ring-shaped portion 201. The grip covers 203 and 204 are put on the grip portions of the ring-shaped portion 201. Herein, a grip portion is a portion of the ring-shaped portion 201 to be held by the user. In the present embodiment, a portion of the ring-shaped portion 201 near the right end thereof and a portion of the ring-shaped portion 201 near the left end thereof are the grip portions. That is, it can be said that when the main portion 202 is located at the central angle of 0° with respect to the center of the ring-shaped portion 201, the grip portions are provided at around the position of +90° and at around the position of −90°. Hereinafter, the grip portion near the right end of the ring-shaped portion 201 will be referred to as the right grip portion, and the grip portion near the left end of the ring-shaped portion 201 will be referred to as the left grip portion. Although not shown in the figures, each grip portion is provided with an element that allows the grip cover 203 or 204 to be put on. Where the grip cover 203 or 204 is removable from the ring-shaped portion 201 as in the present embodiment, the portion where the element that allows the grip cover 203 or 204 to be put on is provided can be said to be the grip portion.

Note that the grip portions may have any configuration such that the grip portions can be recognized distinguished from the other portions of the ring-shaped portion 201. For example, when portions of the ring-shaped portion 201 (specifically, a portion near the left end and a portion near the right end of the ring-shaped portion 201) are of a different color and/or a different pattern from the other portions, they can be said to be grip portions (as they serve to allow the user to realize that they are the portions to be held for performing operations). When portions of the ring-shaped portion 201 (specifically, a portion near the left end and a portion near the right end of the ring-shaped portion 201) are formed to be thicker than the other portions, they can be said to be grip portions (as they serve to allow the user to realize that they are the portions to be held for performing operations). For example, when similar members to the grip covers are non-removably secured to the ring-shaped portion 201, those members can be said to be grip portions. As described above, with the grip portions, the ring-shaped extension apparatus 5 allows the user to perform operations while holding appropriate positions thereof.

Figure 9:
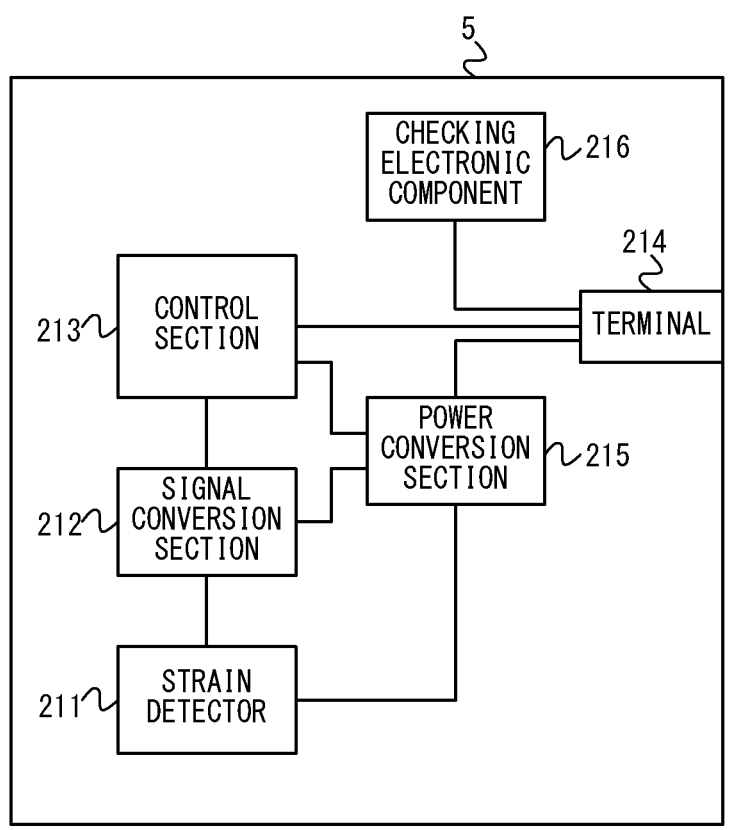
FIG. 9 is a block diagram showing an example of an internal configuration of the non-limiting ring-shaped extension apparatus 5.

FIG. 9 is a block diagram showing an electrical connection relationship between components of the ring-shaped extension apparatus 5. As shown in FIG. 9, the ring-shaped extension apparatus 5 includes a strain detector 211. The strain detector 211 is an example of a detector that detects deformation of the ring-shaped portion 201. In the present embodiment, the strain detector 291 includes a strain gauge. The strain detector 211 outputs a signal representing the strain of the base portion 242 in accordance with the deformation of the elastic member described below (in other words, a signal representing the magnitude of deformation and the direction of deformation of the elastic member).

Herein, in the present embodiment, the ring-shaped portion 201 includes an elastically-deformable elastic portion and a base portion. The base portion holds the opposite end portions of the elastic member so that the base portion and the elastic member together form a ring shape. Note that the base portion is not shown in FIG. 8 since the base portion is provided inside the main portion 202. The base portion is made of a material having a higher rigidity than the elastic member. For example, the elastic member is made of a resin (e.g., an FRP (Fiber Reinforced Plastics)), and the base portion is made of a metal. The strain gauge is provided on the base portion and detects the strain of the base portion. When the ring-shaped portion 201 deforms from the normal state, a strain occurs on the base portion due to the deformation, and the strain on the base portion is detected by the strain gauge. Based on the detected strain, it is possible to calculate the direction in which the ring-shaped portion 201 deforms (i.e., whether it is the direction in which the two grip covers 203 and 204 move closer to each other or the direction in which they move away from each other) and calculate the amount of deformation.

Note that in other embodiments, the strain detector 211 may include, instead of the strain gauge, any sensor that is capable of detecting the deformation of the ring-shaped portion 201 from the normal state. For example, the detector 211 may include a pressure sensor for detecting the pressure that is applied when the ring-shaped portion 201 is deformed, or may include a bend sensor for detecting the amount by which the ring-shaped portion 201 is bent.

The ring-shaped extension apparatus 5 includes a signal converter 212. In the present embodiment, the signal converter 212 includes an amplifier and an AD converter. The signal converter 212 is electrically connected to the strain detector 211 so as to amplify the output signal from the strain detector 211 through the amplifier and performs an AD conversion through the AD converter. The signal converter 212 outputs a digital signal representing the strain value detected by the strain detector 211. Note that in other embodiments, the signal converter 212 may not include an AD converter, and a control section 213 to be described below may include an AD converter.

The ring-shaped extension apparatus 5 includes the control section 213. The control section 213 is a processing circuit including a processor and a memory, and is an MCU (Micro Controller Unit), for example. The control section 213 is electrically connected to the signal converter 212, and the output signal from the signal converter 212 is input to the control section 213. The ring-shaped extension apparatus 5 includes the terminal 214. The terminal 214 is electrically connected to the processing section 213. When the right controller 4 is attached to the ring-shaped extension apparatus 5, a control section 213 sends information representing the strain value that is represented by the output signal from the signal converter 212 (in other words, the ring operation data) to the right controller 4 through the terminal 214.

The ring-shaped extension apparatus 5 includes a power converter 215. The power converter 215 is electrically connected to the sections 211 to 214. The power converter 215 supplies power, which is supplied from the outside (e.g., the right controller 4) through the terminal 214, to the sections 211 to 214. The power converter 215 may supply the supplied power to the sections 211 to 214 after voltage adjustment, etc.

Note that the "data regarding the detection result of the strain detector" that is transmitted by the ring-shaped extension apparatus 5 to another device may be data representing the detection result (in the present embodiment, the output signal from the strain detector 211 representing the strain of the base portion) itself, or may be data that is obtained by performing some processes on the detection result (e.g., data format conversion and/or an arithmetic process on the strain value, etc.). For example, the control section 213 may perform a process of calculating the amount of deformation of the elastic member based on the strain value, which is the detection result, and the "data regarding the detection result of the strain detector" may be data that represents the amount of deformation.

Note that in other embodiments, the ring-shaped extension apparatus 5 may include a battery and may operate by using power from the battery. The battery of the ring-shaped extension apparatus 5 may be a rechargeable battery that can be charged by power supplied from the right controller 4.

Figure 10:
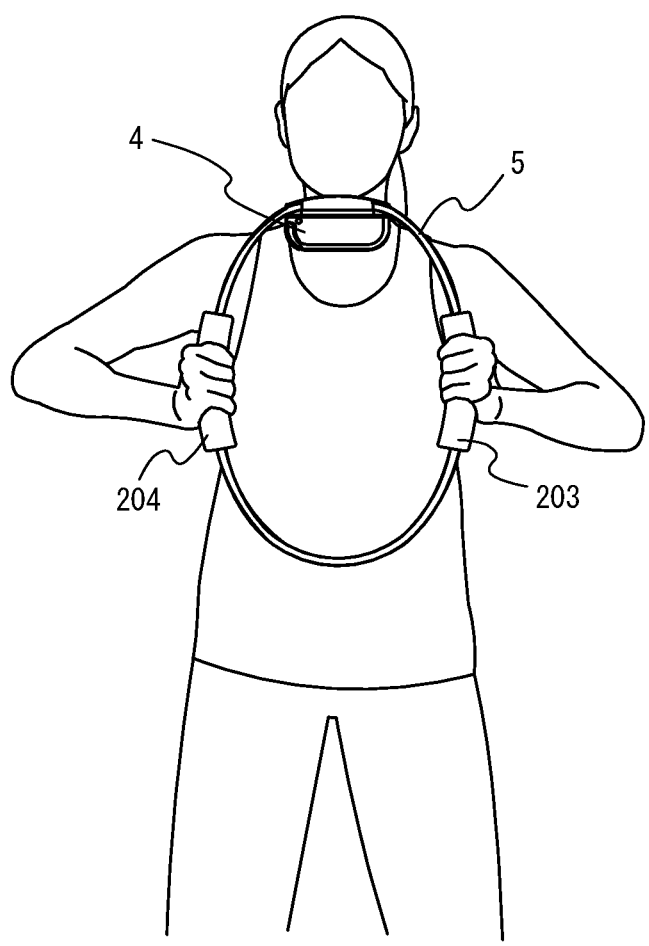
FIG. 10 is a diagram showing an example of how the non-limiting ring-shaped extension apparatus 5 is used by the user.

FIG. 10 is a diagram showing an example of how the ring-shaped extension apparatus 5 is used by the user. As shown in FIG. 10, the user can play a game using the ring-shaped extension apparatus 5 in addition to a game apparatus (e.g., the main body apparatus 2 and the controllers 3 and 4).

For example, as shown in FIG. 10, the user holds the ring-shaped extension apparatus 5 with the right controller 4 attached thereto with both hands. The user can play a game by performing an operation using the ring-shaped extension apparatus 5 (e.g., an operation of deforming the ring-shaped extension apparatus 5 and an operation of moving the ring-shaped extension apparatus 5).

Note that FIG. 10 shows an example of how the user holds the grip covers 203 and 204 and deforms the ring-shaped extension apparatus 5 by pushing in the ring-shaped extension apparatus 5. Through this action, the user can perform, as a game operation, a fitness exercise operation of training the arms. Note that the user can perform a game operation through any of various operations performed using the ring-shaped extension apparatus 5. For example, the user can perform an operation of deforming the ring-shaped extension apparatus 5 with one of the grip covers held by both hands and the other grip cover pressed against the belly. Through this action, the user can perform, as a game operation, a fitness exercise operation of training the arms and the abdominal muscles. The user can perform the operation of deforming the ring-shaped extension apparatus 5 while holding the ring-shaped extension apparatus 5 between the legs with the grip covers 203 and 204 pressed against the inner thighs of the legs. Through this action, the user can perform, as a game operation, a fitness exercise operation of training the leg muscles. Thus, according to the present embodiment, by using the ring-shaped extension apparatus 5, which has a ring shape, the user can perform a wide variety of fitness exercise operations.

2. Outline of Operation on Right Controller 4 and Ring-Shaped Extension Apparatus 5

Figure 11:
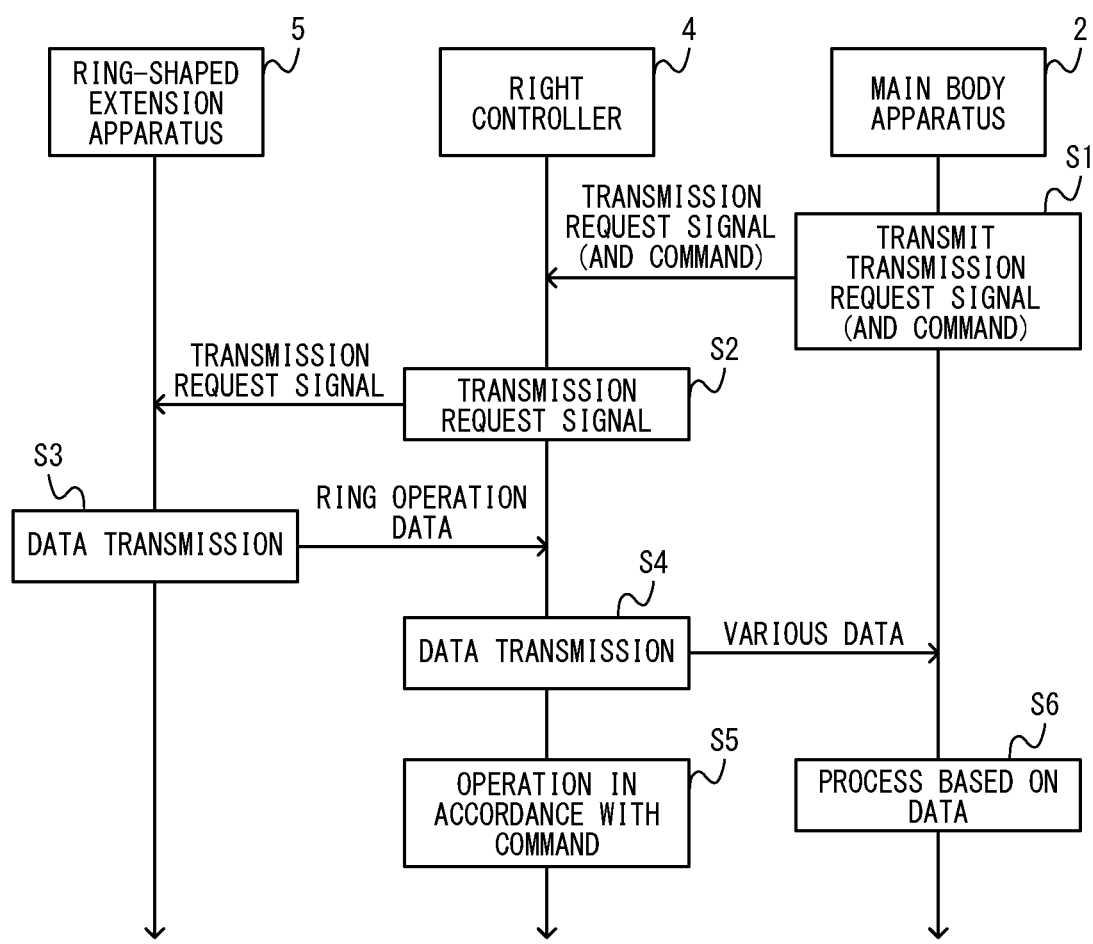
FIG. 11 is a diagram showing an example of a basic flow of data between apparatuses in a main body operation mode.
Figure 12:
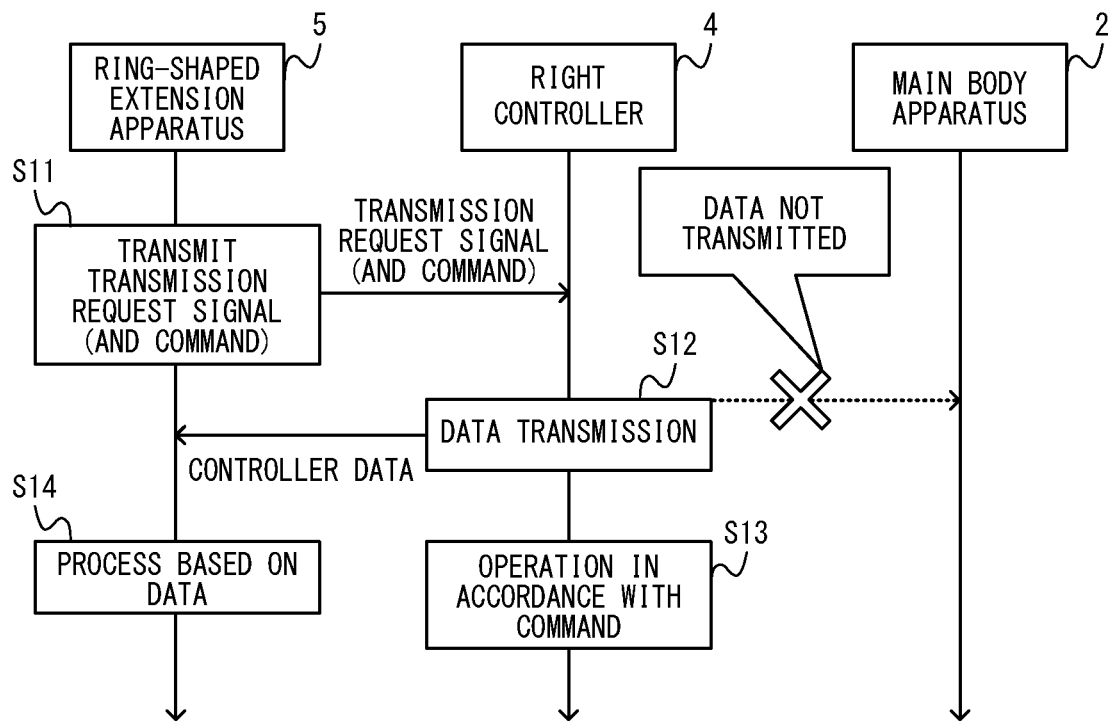
FIG. 12 is a diagram showing an example of processes and a basic flow of data in an independent operation mode.
Figure 13:
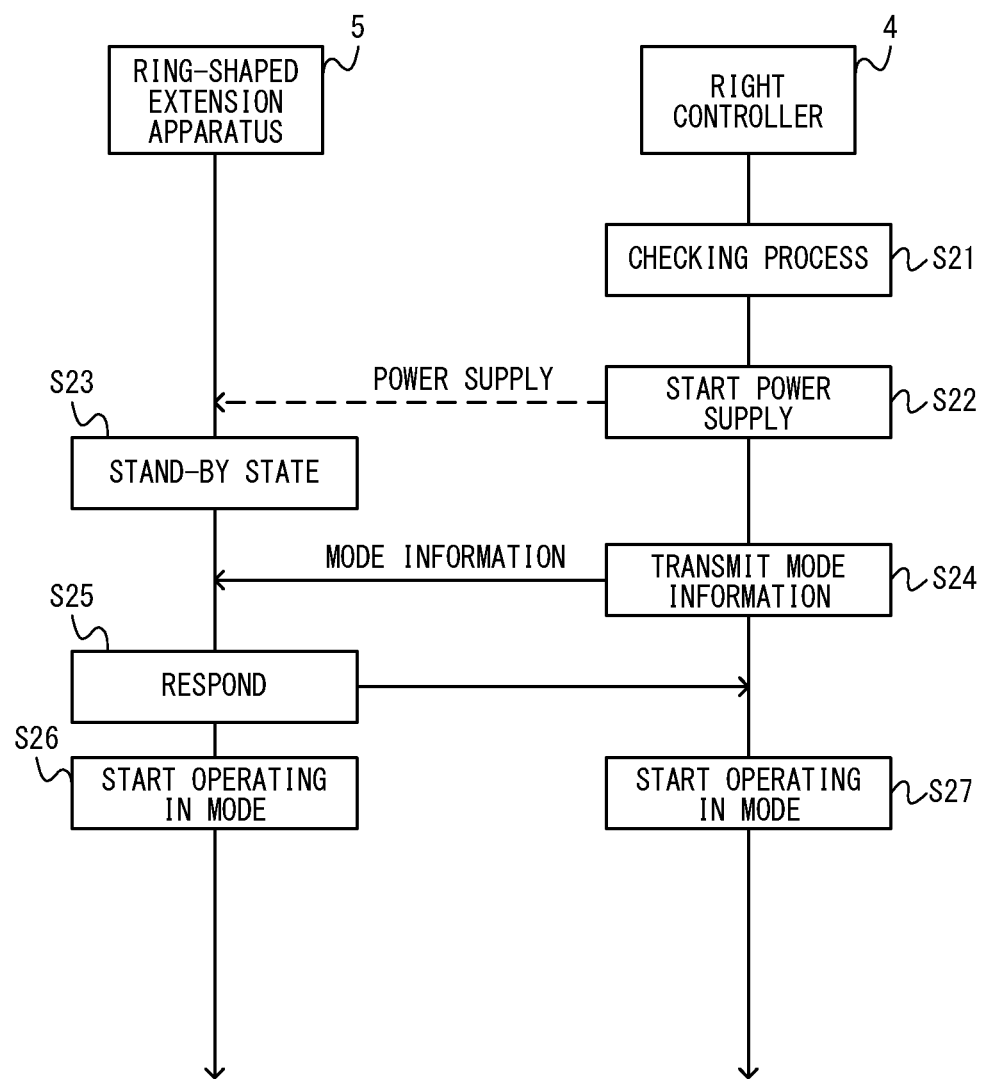
FIG. 13 is a diagram showing an example of a flow of processes executed when a right controller 4 is attached to the ring-shaped extension apparatus 5.

Referring to FIG. 11 to FIG. 13, the operation on the right controller 4 and the operation on the ring-shaped extension apparatus 5 with the right controller 4 attached thereto will be described. In the present embodiment, the right controller 4 and the ring-shaped extension apparatus 5 can operate in two different modes, i.e., the main body operation mode and the independent operation mode. The main body operation mode is a mode in which the right controller 4 and the ring-shaped extension apparatus 5 operate together with the main body apparatus 2, and in which the main body apparatus 2 executes a process based on an input made by the user using the right controller 4 and/or the ring-shaped extension apparatus 5 (e.g., a process of the application being executed by the main body apparatus 2). The independent operation mode is a mode in which the right controller 4 and the ring-shaped extension apparatus 5 execute a process independently of the main body apparatus 2. In the independent operation mode, a process based on an input made by the user using the right controller 4 and/or the ring-shaped extension apparatus 5 is executed, not on the main body apparatus 2, but on the right controller 4 and the ring-shaped extension apparatus 5.

[2-1. Flow of Process in Main Body Operation Mode]

FIG. 11 is a diagram showing an example of a basic flow of data between apparatuses in the main body operation mode. In the main body operation mode, the relationship between the right controller 4 and the ring-shaped extension apparatus 5 is such that communication is made with the right controller 4 being the master and the ring-shaped extension apparatus 5 being the slave. That is, in the main body operation mode, the right controller 4 requests the ring-shaped extension apparatus 5 to transmit data, and the ring-shaped extension apparatus 5 transmits the data to the right controller 4 in response to this request.

First, the main body apparatus 2 transmits a transmission request signal to the ring-shaped extension apparatus 5 (step S1). The transmission request signal is a signal for requesting the addressee of the signal to transmit data. Note that the transmission request signal may or may not include the operation of the addressee apparatus or content of data to be transmitted. For example, the transmission request signal may be a signal representing a command that indicates an instruction to the addressee apparatus. For example, where it is specified in the communication protocol to transmit predetermined data in response to receiving the transmission request signal, the transmission request signal does not need to include the instruction to the addressee apparatus but may be of any content such that the transmission request signal can be distinguished from other signals. Note that in the present embodiment, the transmission request signal is transmitted to the right controller 4 at a transmission timing that iterates at the rate of once per a predetermined amount of time.

When transmitting the transmission request signal, the main body apparatus 2 transmits, to the right controller 4, a command that instructs the right controller 4 to execute a predetermined operation, as necessary. For example, the command may be an output command representing an instruction for the right controller 4 to output a sound and a vibration and/or a lighting command representing an instruction to light the indicator LEDs 67, etc.

The right controller 4 having received the transmission request signal first obtains data from the ring-shaped extension apparatus 5. Specifically, the right controller 4 transmits the transmission request signal to the ring-shaped extension apparatus 5 (step S2). In response to receiving the transmission request signal from the right controller 4, the ring-shaped extension apparatus 5 transmits ring operation data to the right controller 4 (step S3). Thus, the right controller 4 obtains the ring operation data from the ring-shaped extension apparatus 5. Note that the ring operation data is data representing the operation performed using the ring-shaped extension apparatus 5. In the present embodiment, the ring operation data includes information representing the strain value. Specifically, the control section 213 of the ring-shaped extension apparatus 5 transmits the ring operation data to the right controller 4 via the terminal 214.

Note that the content of data that the right controller 4 obtains from the ring-shaped extension apparatus 5 may be specified by the main body apparatus 2. For example, the transmission request signal transmitted from the main body apparatus 2 to the right controller 4 may include information (e.g., information representing the ring operation data) that specifies data to be obtained from the ring-shaped extension apparatus 5.

Next, the right controller 4 wirelessly transmits, to the main body apparatus 2, the ring operation data received from the ring-shaped extension apparatus 5 and controller data (step S4). The controller data is data representing an input performed using the right controller 4. In the present embodiment, the controller data includes information that is obtained from the input sections included in the right controller 4 (specifically, the buttons 113, the analog stick 52, the sensors 114 and 115). Note that the communication control section 111 of the right controller 4 may transmit the controller data and the ring operation data together to the main body apparatus 2 or may transmit the controller data and the ring operation data separately to the main body apparatus 2. The communication control section 111 may transmit data based on the ring operation data to the main body apparatus 2. Note that "data based on the ring operation data" may for example be the ring operation data itself, or may be data that is obtained by performing some processes on the ring operation data (e.g., data formation conversion and/or arithmetic operation on the strain value, etc.). Note that in the main body operation mode, as opposed to the independent operation mode to be described below, the right controller 4 does not transmit the controller data to the peripheral apparatus, and the peripheral apparatus does not receive the controller data from the right controller 4.

When a command is received, together with the transmission request signal, from the main body apparatus 2, the right controller 4 performs an operation in accordance with the command (step S5). For example, the right controller 4 vibrates the vibrator 117 in response to receiving the output command. The right controller 4 lights the indicator LEDs 67 in response to receiving the lighting command.

Note that in the present embodiment, the right controller 4 executes the process of steps S2, S4 and S5 in response to receiving the transmission request signal (and the command) from the main body apparatus 2. Note that in other embodiments, the right controller 4 may execute the processes of steps S4 and S5 in response to receiving the transmission request signal (and the command) from the main body apparatus 2, while executing the process of step S2 at a timing that is different from the reception. In other embodiments, the right controller 4 may execute the process of transmitting to the main body apparatus 2 at a timing that is determined in itself (e.g., a timing that iterates at the rate of once per a predetermined amount of time), instead of at a timing that is in accordance with the transmission request signal from the main body apparatus 2.

The main body apparatus 2 receives data from the right controller 4 and executes a process based on the received data (step S6). Specifically, the main body apparatus 2 executes a process of the application being executed based on the received data. This process may be of any content. For example, when a game application is being executed, the main body apparatus 2 executes a game process (e.g., a process of controlling the action of the player character, or a process of giving an influence an object in the game space) based on the received data. In the main body operation mode, the series of processes of steps S1 to S6 is repeatedly executed.

Note that in the present embodiment, the right controller 4 can operate alone, i.e., where it is not attached to the ring-shaped extension apparatus 5. Then, the main body apparatus 2 and the right controller 4 execute those of the series of processes of steps S1 to S6 shown in FIG. 11 that exclude the processes of S2 and S3. In the present embodiment, the mode of operation in which the processes of steps S1, S4 to S6 are executed by the right controller 4 not attached to the ring-shaped extension apparatus 5 and the main body apparatus 2 is also referred to as the main body operation mode.

[2-2. Flow of Process in Independent Operation Mode]

FIG. 12 is a diagram showing an example of a basic flow of process and data in the independent operation mode. In the independent operation mode, as opposed to the main body operation mode, communication is made with the ring-shaped extension apparatus 5 being the master and the right controller 4 being the slave. That is, in the independent operation mode, the ring-shaped extension apparatus 5 requests the right controller 4 to transmit data, and the right controller 4 transmits the data to the ring-shaped extension apparatus 5 in response to this request.

Specifically, the ring-shaped extension apparatus 5 transmits the transmission request signal to the right controller 4 (step S11). In the present embodiment, the transmission request signal is transmitted to the right controller 4 at a transmission timing that iterates at the rate of once per a predetermined amount of time (e.g., 10 [ms]). In the present embodiment, the ring-shaped extension apparatus 5 transmits the transmission request signal to the right controller 4 for reach iteration of the transmission timing.

At the transmission timing, the ring-shaped extension apparatus 5 transmits, to the right controller 4, a command that causes the right controller 4 to execute a predetermined operation, as necessary, in addition to the transmission request signal. For example, the command may be an output command representing an instruction for the right controller 4 to output a sound and a vibration and/or a lighting command representing an instruction to light the indicator LEDs 67, etc. Note that at the transmission timing, when there is no need to cause the right controller 4 to perform an operation, only the transmission request signal is transmitted, and the command is not transmitted.

The right controller 4 transmits the controller data in response to receiving the transmission request signal from the ring-shaped extension apparatus 5 (step S12). Herein, in the present embodiment, the controller data transmitted from the right controller 4 to the main body apparatus 2 and the controller data transmitted from the right controller 4 to the ring-shaped extension apparatus 5 are of the same content. Note however that in other embodiments, they may be of different content. Herein, in the independent operation mode, the process executed by the peripheral apparatus to which the right controller 4 is attached (herein, the ring-shaped extension apparatus 5) is expected to be a simpler process as compared with a process to be executed by the main body apparatus 2 in the main body operation mode. Therefore, the right controller 4 may use a portion of the controller data transmitted to the main body apparatus 2 as the controller data transmitted to the ring-shaped extension apparatus 5. Thus, it is possible to reduce the amount of data of the controller data transmitted to the ring-shaped extension apparatus 5. For example, where the right controller 4 includes a camera, the right controller 4 may transmit the data of an image captured by the camera to the main body apparatus 2, in which case the right controller 4 may not transmit the data of the image to the ring-shaped extension apparatus 5.

Note that in the independent operation mode, as opposed to the main body operation mode, the right controller 4 does not transmit the controller data to the main body apparatus 2 (see FIG. 12). Note that in the independent operation mode, while the main body apparatus 2 does not communicate with the right controller 4, the main body apparatus 2 does not need to be in the sleep mode, and it may resume from the sleep mode and execute some processes.

When a command is received from the ring-shaped extension apparatus 5, the right controller 4 performs an operation in accordance with the command (step S13). For example, the right controller 4 vibrates the vibrator 117 in response to receiving the output command. The right controller 4 lights the indicator LEDs 67 in response to receiving the lighting command.

The ring-shaped extension apparatus 5 receives the controller data from the right controller 4, and executes a process based on the received controller data (step S14). The ring-shaped extension apparatus 5 executes a process based on the strain value detected by the strain detector 211 thereof. Although the details will be described later, in the present embodiment, the ring-shaped extension apparatus 5 executes a process of causing the right controller 4 to output a sound and a vibration in response to the operation of deforming the ring-shaped extension apparatus 5, and executes a process of turning ON/OFF a sound and a vibration in response to an input to the right controller 4, etc.

In the process of step S14, the ring-shaped extension apparatus 5 generates a command to the right controller 4, as necessary. In the independent operation mode, the series of processes of steps S1*l* to S14 are repeatedly executed. Therefore, the command generated in step S14 is transmitted to the right controller 4 in the process of step S1*l* to be executed next.

As described above, in the present embodiment, the right controller 4 and the ring-shaped extension apparatus 5 can operate not only in the main body operation mode in which the main body apparatus 2 executes processes, but also in the independent operation mode in which they execute processes independently of the main body apparatus 2. Therefore, the user can use the right controller 4 and the ring-shaped extension apparatus 5 operating in the independent operation mode during a period in which no application is being executed on the main body apparatus 2. For example, the user can perform a fitness exercise operation using the ring-shaped extension apparatus 5 also during a period in which no application is being executed on the main body apparatus 2.

In the present embodiment, data representing the record of the fitness exercise operation performed while in the independent operation mode, and when an application using the ring-shaped extension apparatus 5 is thereafter executed on the main body apparatus 2, the main body apparatus 2 executes the game process based on the data. Therefore, in the present embodiment, the results of a fitness exercise operation performed by the user during the period in which no application is being executed can be reflected in the application.

Note that the right controller 4 and the ring-shaped extension apparatus 5 may be able to operate in another mode different from the main body operation mode and the independent operation mode. For example, the right controller 4 is capable of operating in a main body-attached mode to be described below while attached to the main body apparatus 2. In addition to operating in any of these modes, the right controller 4 is capable of being in the sleep mode. In the sleep mode, the right controller 4 does not perform data communication with another apparatus (excluding the signal exchange for starting wireless communication), but accepts an input to operation sections thereof (e.g., the buttons 113 and the analog stick 52). In the sleep mode, when an input to an operation section is detected, the right controller 4 resumes from the sleep mode.

As described above, in the present embodiment, in the independent operation mode, based on the peripheral apparatus data (herein, ring operation data) in accordance with a user input detected by a sensor (herein, the strain detector 211), a peripheral apparatus (herein, the ring-shaped extension apparatus 5) generates a command for causing the right controller 4 to execute a predetermined operation and transmits the command to the right controller 4. With such a configuration, in the independent operation mode, since the right controller 4 operates in accordance with the command from the peripheral apparatus, the process of the right controller 4 in the independent operation mode can be a general-purpose process so that a game controller is easily compatible with different types of peripheral apparatuses. Since the process on the right controller 4 can be made simple, it is possible to reduce the amount of data of the program and data for executing the process, and it is possible to reduce the amount of data on the right controller 4.

Now, consider a case where the right controller 4 is attachable to a plurality of types of peripheral apparatuses, wherein the right controller 4 and the peripheral apparatus operate differently depending on the peripheral apparatus in the independent operation mode. In such a case, assuming that the right controller 4 executes a different process for each peripheral apparatus (e.g., a process of causing the right controller 4 to give a different output for each peripheral apparatus depending on a user input to the peripheral apparatus), programs and data for different processes are stored in the right controller 4, thereby possibly increasing the amount of data on the right controller 4 and limiting the storage area of the right controller 4. In contrast, in the present embodiment, even if different processes are executed in the independent operation mode for different peripheral apparatuses, a common process can be used on the right controller 4. For example, for the process of causing the right controller 4 to give an output depending on a user input to the peripheral apparatus, a command for giving an output is generated on the peripheral apparatus side, and the right controller 4 is made to execute an operation in accordance with the command, thereby realizing a common process to be performed on the right controller 4, irrespective of the type of the peripheral apparatus. Thus, the right controller 4 can be used as a general-purpose controller that is easily compatible with different peripheral apparatuses. By improving the general-purpose-ness of the process performed on the right controller 4 in the independent operation mode, it is possible to reduce the amount of data to be stored for processes on the right controller 4.

In the present embodiment, the peripheral apparatus is configured to, in the independent operation mode, transmit the transmission request signal to the right controller 4 and execute a process based on the controller data transmitted from the right controller 4 in response to the right controller 4 receiving the transmission request signal. Then, for example, a process based on an input to the right controller 4 (e.g., a process of turning ON/OFF the output of a sound and a vibration from the right controller 4 depending on the input to the buttons of the right controller 4) can be executed on the peripheral apparatus side where the controller data is received. Thus, processes that vary for different peripheral apparatuses can be executed on the peripheral apparatus side, and processes that are common between different peripheral apparatuses can easily be executed on the right controller 4 side. Also with this configuration, it can be said that the process of the right controller 4 in the independent operation mode can be a general-purpose process. That is, also with the configuration described above, the right controller 4 can be used as a general-purpose controller. With the configuration described above, it is possible to suppress the increase in the processes to be executed on the right controller 4, and it is possible to reduce the amount of data on the right controller 4 by reducing programs and data used for processes.

Note that in the independent operation mode, the right controller 4 receives, from the peripheral apparatus, a command in accordance with the controller data transmitted to the peripheral apparatus, and operates in accordance with the command. In the main body operation mode, the right controller 4 receives, from the main body apparatus 2, a command in accordance with the controller data transmitted to the main body apparatus 2, and operates in accordance with the command. Thus, by making the right controller 4 operate in accordance with a command from another apparatus in either mode, it is possible to simplify the process on the right controller 4 and it is possible to reduce the amount of data of programs and data for the process.

In the present embodiment, in the independent operation mode, the peripheral apparatus receives, from the right controller 4, controller data in accordance with a user input to the right controller 4. Thus, a process based on a user input to the right controller 4 can be executed on the peripheral apparatus side. Based on the controller data, the peripheral apparatus generates a command for causing the right controller 4 to execute a predetermined operation, and transmits the command to the right controller. Thus, a process for causing the right controller 4 to perform an operation can be executed on the peripheral apparatus side. For example, if the operation to be executed by the right controller 4 in accordance with a particular button input to the right controller 4 (e.g., to output a vibration, etc.) is varied for each peripheral apparatus and the correspondence between each button input and an associated operation for each of a plurality of peripheral apparatuses is stored in the right controller 4, it possibly increases the storage capacity needed for the right controller 4. In contrast, according to the present embodiment, it is possible to suppress the increase in the storage capacity needed for the right controller 4.

Note that in the present embodiment, the peripheral apparatus receives, from the right controller 4, controller data for operable ones (specifically, the buttons 53 to 58, 60 and 61) of the buttons on the right controller 4. Note that since the second L button 65 and the second R button 66 are not operable when the right controller 4 is attached to the peripheral apparatus, the right controller 4 does not need to transmit data for these buttons 65 and 66. According to the description above, the peripheral apparatus can execute processes based on inputs to the operable buttons on the right controller 4. Since the content of the controller data to be transmitted to the peripheral apparatus from the right controller 4 can be made common between different peripheral apparatuses, the process on the right controller 4 can be a general-purpose process. Note that in this process, the peripheral apparatus can transmit, to the right controller 4, a command that is based on a portion of the controller data and that is not based on the other portion of the controller data. Specifically, the peripheral apparatus may generate a command based on a portion of the controller data but not based on the other portion of the controller data, or the peripheral apparatus may generate a plurality of commands based on all of the controller data, and transmit one of a plurality of commands (that is generated not based on the portion of the controller data) to the right controller 4. As described above, the peripheral apparatus does not need to execute the process by using all the data for different buttons included in the controller data. In other embodiments, the peripheral apparatus may receive, from the right controller 4, controller data relating to all of the operation sections (e.g., the buttons and the analog stick) of the right controller 4.

[2-3. Process Until Start of Operation in Each Mode]

Next, the process until the start of each mode described above will be described below. In the present embodiment, after resumption from the sleep mode, the right controller 4 starts operating in a mode in response to the satisfaction of a condition for that mode, from among different conditions for different modes. Although the details will be described later, when the right controller 4 is attached to a peripheral apparatus, information representing the mode of operation (the mode information to be described below) is transmitted from the right controller 4 to the peripheral apparatus so that the peripheral apparatus also operates in the same mode as the right controller 4.

The independent operation mode is started on the condition that a predetermined start operation on the right controller 4 is detected in a state where the wireless connection between the right controller 4 and the main body apparatus 2 has not been established and the right controller 4 is attached to a peripheral apparatus that is compatible with the independent operation mode (i.e., a peripheral apparatus that is capable of operating in the independent operation mode). Herein, the state where the wireless connection between the right controller 4 and the main body apparatus 2 has been established is the state where data can be exchanged between the right controller 4 and the main body apparatus 2 via wireless communication. Note that the state where the wireless connection has not been established does not only refer to the state where radio waves from one apparatus cannot be received by the other apparatus. Even in the state where the wireless connection has not been established, the right controller 4 and the main body apparatus 2 can execute a communication process for establishing the wireless connection. Note that the right controller 4 in the sleep mode is in the state where the wireless connection with the main body apparatus 2 has not been established.

In the present embodiment, the start operation is an operation of pressing down the analog stick 52. Note however that the start operation may be any input that is performed using the right controller 4. The start operation may be an input that is performed while the right controller 4 is in the sleep mode. That is, when the start operation is performed on the right controller 4 in the state where the right controller 4 in the sleep mode is attached to a peripheral apparatus that is compatible with the independent operation mode, the right controller 4 resumes from the sleep mode and starts operating in the independent operation mode.

On the other hand, the main body operation mode is started on the condition that the wireless connection between the right controller 4 and the main body apparatus 2 is established after the right controller 4 resumes from the sleep mode. Herein, when an input on an operation section of the right controller 4 is detected in the state where the wireless connection with the main body apparatus 2 has not been established (excluding a case where the independent operation mode is started in response to the start operation described above and a case where it is operating in the independent operation mode), the right controller 4 executes a communication process for establishing the wireless connection between the right controller 4 and the main body apparatus 2. When a wireless connection is established therebetween through this communication process, the right controller 4 operates in the main body operation mode. Note that in the communication process, when the main body apparatus 2 is in the sleep mode or when radio waves from the right controller 4 are not received by the main body apparatus 2, a wireless connection is not established. In this case, the main body operation mode is not started, and the state where the operation mode of the right controller 4 is undecided is maintained. Note that the input performed using the right controller 4 for executing the communication process may be any input, e.g., a predetermined input using the right controller 4 (e.g., an input on the first R button 60 or an input on the first R button 60 and the ZR button 61).

When an input on the home button 58 is detected in the state where the wireless connection with the main body apparatus 2 has not been established, the right controller 4 executes the communication process after transmitting, to the main body apparatus 2, a resume signal for causing the main body apparatus 2 to resume from the sleep mode. That is, if the user wishes to establish the wireless connection between the main body apparatus 2 in the sleep mode and the right controller 4, the user can press the home button 58 of the right controller 4. Note that when an input on the home button 58 of the right controller 4 is detected after the main body apparatus 2 has resumed from the sleep mode, the main body apparatus 2 may behave in any manner. For example, when an input on the home button 58 is detected while an application is being executed, the main body apparatus 2 may pause the application being executed and display a menu image on the main body apparatus 2. When an input on the home button 58 is detected while the menu image is displayed, the main body apparatus 2 may transition to the sleep mode.

As described above, the user can make the right controller 4 operate in the main body operation mode as follows, for example.

Perform an input on an operation section of the right controller 4 being in the sleep mode in the state where the right controller 4 is not attached to a peripheral apparatus. Moreover, the user can make the right controller 4 and the peripheral apparatus operate in the main body operation mode by attaching the right controller 4 in the main body operation mode to the peripheral apparatus (e.g., the ring-shaped extension apparatus 5).

Perform an input that is different from the start operation described above to resume the right controller 4, being in the sleep mode and attached to the peripheral apparatus, from the sleep mode.

Note that when the right controller 4 is used while being attached to the ring-shaped extension apparatus 5 in an application that is executed on the main body apparatus 2, the user can establish the wireless connection between the right controller 4 and the main body apparatus 2 before or after the execution of the application and have the right controller 4 operate in the main body operation mode. In this process, the user can make the right controller 4 operate in the main body operation mode and then attach the right controller 4 to the ring-shaped extension apparatus 5 so that they both operate in the main body operation mode, or the user can attach the right controller 4 to the ring-shaped extension apparatus 5 and then make the right controller 4 operate in the main body operation mode so that they both operate in the main body operation mode.

Note that when the right controller 4 is attached to the main body apparatus 2, the right controller 4 operates in the main body-attached mode. Herein, the main body-attached mode is a mode in which the main body apparatus 2 executes a process based on a user input to the right controller 4. In the main body-attached mode, the main body apparatus 2 requests the right controller 4 to transmit data, and the right controller 4 transmits the data to the main body apparatus 2 in response to this request. The process performed by the right controller 4 in the main body-attached mode is similar to the process performed by the right controller 4 in the independent operation mode in that the right controller 4 operates in accordance with the command from the apparatus to which the right controller 4 is attached (herein, the main body apparatus 2 or the ring-shaped extension apparatus 5). Therefore, in the present embodiment, the right controller 4 can use the program for the process in the main body-attached mode, as the program for the process in the independent operation mode. Thus, it is possible to reduce the amount of data stored in the right controller 4.

FIG. 13 is a diagram showing an example of a flow of processes executed when the right controller 4 is attached to the ring-shaped extension apparatus 5. The process shown in FIG. 13 is started in response to the attachment of the right controller 4, having resumed from the sleep mode, to the ring-shaped extension apparatus 5, or in response to the resumption from the sleep mode of the right controller 4 attached to the ring-shaped extension apparatus 5.

First, the right controller 4 executes a checking process of checking the apparatus to which the right controller 4 is attached (step S21). The checking process is a process of checking the type of the apparatus to which the right controller 4 is attached. Herein, the peripheral apparatus that can be attached to the right controller 4 (and the main body apparatus 2) includes a checking electronic component, and the ring-shaped extension apparatus 5 also includes a checking electronic component 216 (see FIG. 9). The checking electronic component is an electronic component used for the right controller 4 to check the type of the peripheral apparatus (and the main body apparatus 2), and is different from the electric elements that are powered by power supplied from the right controller 4 (e.g., the strain detector 211, the signal converter 212 and the control section 213). The checking electronic component may be any electronic component having a resistance value. As shown in FIG. 9, the checking electronic component 216 is not connected to the power converter 215, and does not need to receive power supply via the power converter 215. In the present embodiment, the checking electronic component has a resistance value depending on the type of the peripheral apparatus. As shown in FIG. 9, the checking electronic component is electrically connected to the terminal of the peripheral apparatus, and when the right controller 4 is attached to the peripheral apparatus, the terminal 64 of the right controller 4 is electrically connected to the checking electronic component. Thus, the electric elements on the right controller 4 side and the checking electronic component on the peripheral apparatus side together form a circuit (referred to as the "checking circuit"). In the present embodiment, a peripheral apparatus (e.g., the ring-shaped extension apparatus 5) that is compatible with the independent operation mode includes a checking electronic component having a predetermined resistance value. Thus, the right controller 4 can determine the type of the peripheral apparatus (herein, at least whether it is a peripheral apparatus of the type that corresponds to the independent operation mode) based on the resistance value of the checking circuit that is formed as the right controller 4 is attached to the peripheral apparatus.

In the checking process, the right controller 4 detects the resistance value of the checking circuit. Then, the right controller 4 determines whether or not the detected resistance value is in a determination range that includes the predetermined value described above. The determination is a process of determining whether or not the peripheral apparatus to which the right controller 4 is attached is a peripheral apparatus that is compatible with the independent operation mode. Note that in the present embodiment, the determination range is used for the determination in view of the possibility that there may be an error in the detected resistance value. The extent of the predetermined range can be determined appropriately.

Note that in the present embodiment, it is assumed that the main body apparatus 2 includes a checking electronic component having a resistance value that is outside the determination range and that is different from that of the checking electronic component of the peripheral apparatus. Therefore, in the present embodiment, the right controller 4 can also determine whether or not the apparatus to which the right controller 4 is attached is the main body apparatus 2 based on the detected resistance value. When it is determined in step S21 that the right controller 4 is attached to the main body apparatus 2, the right controller 4 ends the process shown in FIG. 13 and starts operating in the main body-attached mode.

On the other hand, when it is determined that the peripheral apparatus to which the right controller 4 is attached is a peripheral apparatus that is compatible with the independent operation mode, the right controller 4 starts supplying power to the peripheral apparatus (herein, the ring-shaped extension apparatus 5) (step S22). Note that although not shown in the figures, when it is not determined that the peripheral apparatus to which the right controller 4 is attached is a peripheral apparatus that is compatible with the independent operation mode, the right controller 4 does not start supplying power to the peripheral apparatus, ends the process shown in FIG. 13, and enters the sleep mode.

Note that in other embodiments, there may be a peripheral apparatus that is not compatible with the independent operation mode but is capable of receiving power supply from the right controller 4. Such a peripheral apparatus includes a checking electronic component whose resistance value is different from that of the checking electronic component of a peripheral apparatus compatible with the independent operation mode and different from that of the checking electronic component of a peripheral apparatus that is not capable of receiving power supply from the right controller 4. Although it is not determined that the peripheral apparatus to which the right controller 4 is attached is a peripheral apparatus that is compatible with the independent operation mode, the right controller 4 may supply power to the peripheral apparatus. Note that in such a case, the right controller 4 does not operate in the independent operation mode, but operates in the main body operation mode on the condition that the wireless connection between the right controller 4 and the main body apparatus 2 has been established, for example.

The ring-shaped extension apparatus 5 starts up in response to the start of the power supply from the right controller 4. After the start-up, the ring-shaped extension apparatus 5 is in the stand-by state waiting for mode information described below to be transmitted from the right controller 4 (step S23). Note that at this point, the mode in which the ring-shaped extension apparatus 5 operates is undecided.

On the other hand, when the condition for starting the main body operation mode or the independent operation mode is satisfied after the start of the power supply, the right controller 4 transmits the mode information to the ring-shaped extension apparatus 5 (step S24). The mode information represents the mode in which the right controller 4 and the peripheral apparatus attached thereto should operate.

Note that in the present embodiment, as described above, the condition for starting the main body operation mode is the establishment of the wireless connection between the right controller 4 and the main body apparatus 2. For example, when the process shown in FIG. 13 is started in response to an input different from the start operation performed using the right controller 4 being in the sleep mode, thereby causing the right controller 4 to resume from the sleep mode, the right controller 4 executes the process of step S24 in response to the establishment of the wireless connection with the main body apparatus 2 after step S22. When the condition for starting the main body operation mode is satisfied, in the process of step S24, the right controller 4 transmits mode information representing the main body operation mode to the peripheral apparatus (herein, the ring-shaped extension apparatus 5). When the right controller 4 is operating in the main body operation mode at the start of the process shown in FIG. 13 (i.e., when the right controller 4 operating in the main body operation mode is attached to the ring-shaped extension apparatus 5), the right controller 4 executes the process of step S24 following step S22.

As described above, the condition for starting the independent operation mode is that the wireless connection between the right controller 4 and the main body apparatus 2 has not been established and that the start operation is performed using the right controller 4 attached to a peripheral apparatus that is compatible with the independent operation mode. For example, the right controller 4 resumes from the sleep mode in response to the start operation performed using the right controller 4, which is in the sleep mode and attached to the ring-shaped extension apparatus 5. If the process shown in FIG. 13 is started because the right controller 4 resumes from the sleep mode in such a manner, the right controller 4 executes the process of step S24 after step S22. When the condition for starting the independent operation mode is satisfied, in the process of step S24, the right controller 4 transmits mode information, representing the independent operation mode, to the peripheral apparatus (herein, the ring-shaped extension apparatus 5).

When the mode information from the right controller 4 is received, the ring-shaped extension apparatus 5 responds to this for acknowledging the receipt of the mode information (step S25). Then, the ring-shaped extension apparatus 5 starts operating in the mode indicated by the mode information (step S26).

On the other hand, the right controller 4 starts operating in the mode indicated by the mode information in response to receiving the response from the ring-shaped extension apparatus 5 (step S27). Thus, the right controller 4 and the ring-shaped extension apparatus 5 both start operating in the same mode.

As described above, in the present embodiment, the peripheral apparatus (herein, the ring-shaped extension apparatus 5) is powered by power supplied from the right controller 4 electrically connected to the peripheral apparatus. When the peripheral apparatus starts up based on the power supplied from the right controller 4, the peripheral apparatus is in the stand-by state waiting for receiving, from the right controller 4, mode information that indicates one of a plurality of modes in which the peripheral apparatus should operate. In this process, the right controller 4 generates the mode information and transmits the mode information to the peripheral apparatus. Then, the peripheral apparatus operates in the mode indicated by the mode information that is received from the right controller 4 in the stand-by state. The peripheral apparatus is not capable of determining, by itself, which mode the peripheral apparatus should be operating at the time of start-up. However, according to the description above, the peripheral apparatus can operate in an appropriate mode in accordance with the right controller 4 after the start-up of the peripheral apparatus.

In the present embodiment, a peripheral apparatus is a part of a circuit that is formed through electrical connection between the right controller and the peripheral apparatus, and includes a checking electronic component having a predetermined resistance value. Then, the right controller 4 can determine the information (e.g., the type) of the peripheral apparatus by detecting the resistance value of the circuit.

Moreover, in the present embodiment, the resistance value of a checking circuit that is formed through electrical connection between a peripheral apparatus that is compatible with the independent operation mode and the right controller 4 is a first value, and the resistance value of a checking circuit that is formed through electrical connection between a peripheral apparatus that is not compatible with the independent operation mode and the right controller 4 is a second value different from the first value. On the condition that the resistance value of the checking circuit is within a predetermined range (e.g., the determination range) that includes the first value and does not include the second value, the right controller 4 transmits mode information representing the independent operation mode to the apparatus. Then, it is possible to prevent mode information representing the independent operation mode from being transmitted to a peripheral apparatus that is not compatible with the independent operation mode, and it is possible to prevent the right controller 4 from erroneously operating in the independent operation mode when the right controller 4 is attached to the peripheral apparatus.

In the present embodiment, when the resistance value of the checking circuit is in a first range (e.g., the determination range), the right controller 4 is capable of operating in the independent operation mode and also capable of operating in the main body operation mode. On the other hand, when the resistance value of the checking circuit is in a second range different from the first range, the right controller 4 is capable of operating in the main body operation mode and is prohibited from operating in the independent operation mode (i.e., does not operate in the independent operation mode). Also with such a configuration, it is possible to prevent the right controller 4 from erroneously operating in the independent operation mode when the right controller 4 is attached to a peripheral apparatus that is not compatible with the independent operation mode.

In the present embodiment, the right controller 4 detects the resistance value and determines whether or not the detected resistance value is within the first range. Herein, any method may be used to determine that "the resistance value is within the first range" and to determine that "the resistance value is within the second range different from the first range". For example, the right controller 4 may perform such a determination based on a parameter that is correlated to the resistance value (in other words, a parameter based on which the resistance value can be calculated, e.g., voltage or power), instead of the resistance value.

The right controller 4 operates in the independent operation mode, in response to detecting a predetermined input (e.g., the start operation) performed using the right controller 4 while the right controller 4 is attached to the peripheral apparatus and the communication connection with the main body apparatus 2 has not been established, at least on the condition that the resistance value of the checking circuit formed through electrical connection between the right controller 4 and the peripheral apparatus is within the determination range. Then, the user can make the right controller 4 start the independent operation mode at a desired timing, and it is possible to prevent the right controller 4 from erroneously operating in the independent operation mode when the right controller 4 is attached to a peripheral apparatus that is not compatible with the independent operation mode.

At least on the condition that the resistance value of the checking circuit is within the determination range (more specifically, in response to detecting the resistance value within the determination range), the right controller 4 supplies power to other parts of the peripheral apparatus (specifically, the strain detector 211, the signal converter 212 and the control section 213) different from the part thereof that forms the checking circuit. Note that when the resistance value of the checking circuit is not within the determination range, the right controller 4 does not supply power to the peripheral apparatus. Then, it is possible to prevent the right controller 4 from erroneously supplying power to a peripheral apparatus that does not need to receive power supply. It is also possible to prevent an unauthorized peripheral apparatus (e.g., an apparatus that functions the same as the ring-shaped extension apparatus 5 but the resistance value of the checking circuit thereof is outside the determination range) from operating when the right controller 4 is attached to the unauthorized peripheral apparatus.

[2-4. Specific Example of Processes in Independent Operation Mode]

Next, a specific example of processes performed on the ring-shaped extension apparatus 5 in the independent operation mode will be described. In the independent operation mode, the ring-shaped extension apparatus 5 detects an operation by the user deforming the ring-shaped extension apparatus 5, and counts and stores the number of times the operation is performed. The processes to be executed in the independent operation mode will now be described.

The ring-shaped extension apparatus 5 detects a push-in operation and a pull operation performed thereon. Note that a push-in operation is an operation of deforming the ring-shaped portion 201 in a direction (referred to as the "push-in direction") such that the two grip portions of the ring-shaped extension apparatus 5 come closer to each other. A pull operation is an operation of deforming the ring-shaped portion 201 in a direction (referred to as the "pull direction") such that the two grip portions move away from each other. Note that the amount of deformation of the ring-shaped extension apparatus 5 can be calculated based on the strain value output from the strain detector 211, and a push-in operation or a pull operation can be detected based on the amount of deformation. Specifically, the ring-shaped extension apparatus 5 detects a push-in operation when the amount of deformation in the push-in direction is greater than a predetermined push-in threshold, and detects a pull operation when the amount of deformation in the pull direction is greater than a predetermined pull threshold. The ring-shaped extension apparatus 5 keeps the operation count by incrementing the count each time a push-in operation or a pull operation is detected. The ring-shaped extension apparatus 5 stores the operation count in a memory of the control section 213. In the present embodiment, the memory is a non-volatile memory and retains the data even after the power supply to the peripheral apparatus is stopped. Note that in the main body operation mode, the ring-shaped extension apparatus 5 does not keep or store the operation count.

Note that while the ring-shaped extension apparatus 5 keeps the total operation count, including the push-in operation count and the pull operation count, without distinguishing between these operations in the present embodiment, it may separately keep the push-in operation count and the pull operation count in other embodiments.

As described above, in the present embodiment, the peripheral apparatus includes a memory that stores the number of times a user input is detected by a sensor (e.g., the strain detector 211) in the independent operation mode. Specifically, the peripheral apparatus determines whether or not the value detected by the sensor is greater than a predetermined threshold, and increments the user input count when it is determined that the detected value is greater than the threshold. Then, the game system 1 can execute a process (e.g., a process of an application executed on the main body apparatus 2) after the end of the independent operation mode by using inputs that have been made by the user while in the independent operation mode.

The ring-shaped extension apparatus 5 causes the right controller 4 to output a sound and a vibration in accordance with a push-in operation and a pull operation. In the present embodiment, the ring-shaped extension apparatus 5 causes the right controller 4 to output a sound and a vibration at a timing in accordance with the detection of a push-in operation and at a timing in accordance with the detection of a pull operation.

Note that the ring-shaped extension apparatus 5 may cause the right controller 4 to output a sound and a vibration at any timing in accordance with an operation. For example, the ring-shaped extension apparatus 5 may cause the right controller 4 to output a sound and a vibration at a timing when the amount of deformation moves across the push-in threshold and at a timing when the amount of deformation moves across the pull threshold. Note that a timing when the amount of deformation moves across threshold means to include both a timing when the amount of deformation increases above the threshold (i.e., becomes greater than the threshold) and a timing when the amount of deformation decreases below the threshold (i.e., becomes less than the threshold). Then, a sound and a vibration will be output from the right controller 4 at a timing when a push-in operation or a pull operation by the user is detected and at a timing between the detection of a push-in operation or a pull operation and the ring-shaped extension apparatus 5 returning to the normal state.

The ring-shaped extension apparatus 5 causes the right controller 4 to output a sound and a vibration in response to the operation count reaching a predetermined round number (e.g., an integral multiple of 100). Moreover, the ring-shaped extension apparatus 5 causes the right controller 4 to output a sound and a vibration in response to the operation count reaching an upper limit number (e.g., 500) that is set in the control section 213 of the ring-shaped extension apparatus 5. Note that the manner in which a sound and a vibration are output (e.g., the frequency, the volume/intensity, the length, the number of repetitions, etc.) may be varied between those that are output in response to each operation, those that are output in response to the operation count reaching a round number, and those that are output in response to the operation count reaching the upper limit number.

When a sound and a vibration are output from the right controller 4, the ring-shaped extension apparatus 5 generates an output command representing an instruction to output a sound and a vibration, and transmits the output command to the right controller 4. In the present embodiment, the right controller 4 outputs both of a sound and a vibration from the vibrator 117. The ring-shaped extension apparatus 5 generates an output command that includes data specifying a waveform of a sound and a vibration to be input to the vibrator 117. Note that data specifying a waveform may be data representing a waveform itself, data representing information that specifies a waveform (e.g., information of the frequency and the amplitude), or data representing information that specifies one of waveform patterns to be input to the vibrator 117 (e.g., the number assigned to the waveform pattern).

The ring-shaped extension apparatus 5 changes, in response to a user operation, the setting regarding the output of a sound and a vibration from the right controller 4 in the independent operation mode. Specifically, the ring-shaped extension apparatus 5 turns ON/OFF the sound output in response to a sound switching operation by the user, and turns ON/OFF the vibration output in response to a vibration switching operation by the user. In the present embodiment, these operations are performed using the right controller 4. Specifically, the ring-shaped extension apparatus 5 turns ON/OFF the sound output in response to the operation of pressing the A button 53 of the right controller 4, and turns ON/OFF the vibration output in response to the operation of pressing the B button 54 of the right controller 4.

When the setting for the output of a sound and a vibration through the operation described above is switched, the ring-shaped extension apparatus 5 generates the output command in accordance with the setting after being switched. For example, where the sound output is set to OFF and the vibration output is set to ON, the ring-shaped extension apparatus 5 generates an output command so as to include data specifying a waveform that is output only as a vibration (e.g., a waveform that only includes a frequency outside the human audible range and does not include a frequency within the human audible range). For example, when the sound output is set to ON and the vibration output is set to OFF, the ring-shaped extension apparatus 5 generates an output command so as to include data specifying a waveform that is output only as a sound (e.g., a waveform that only includes a frequency within the human audible range and does not include a frequency outside the human audible range). For example, when the sound output and the vibration output are both set to OFF, the ring-shaped extension apparatus 5 generates an output command so as to include data specifying a waveform whose output is 0. Note that in this case, the ring-shaped extension apparatus 5 may generate no output command.

As described above, in the present embodiment, the process of generating an output command based on the setting that is changed in accordance with the controller data indicating that a sound switching operation or a vibration switching operation has been performed is a specific example of the process of generating a command based on the controller data from the right controller 4. Herein, in other embodiments, the ring-shaped extension apparatus 5 may execute another process as the process of generating a command based on the controller data from the right controller 4. For example, the ring-shaped extension apparatus 5 may generate the output command so as to output a sound and/or a vibration in accordance with a sound switching operation or a vibration switching operation performed using the right controller 4.

In the independent operation mode, the ring-shaped extension apparatus 5 lights the indicator LEDs 67 of the right controller 4. In the present embodiment, the ring-shaped extension apparatus 5 lights the indicator LEDs 67 in a manner (e.g., the four indicator LEDs 67 are all lit) that can be distinguished from a mode other than the independent operation mode. Thus, it is possible to notify the user that the right controller 4 is operating in the independent operation mode. Specifically, the ring-shaped extension apparatus 5 generates a lighting command representing an instruction to light the indicator LEDs 67 and transmits the lighting command to the right controller 4. The lighting command includes data representing the manner in which four indicator LEDs 67 are lit. Note that in the present embodiment, the ring-shaped extension apparatus 5 lights the indicator LEDs 67 of the right controller 4 in the manner described above during the period of the independent operation mode. Therefore, when the independent operation mode is started, the ring-shaped extension apparatus 5 generates a lighting command representing an instruction to light the four indicator LEDs 67 in the manner described above and transmits the lighting command to the right controller 4. Then, when the independent operation mode is ended, the ring-shaped extension apparatus 5 generates a lighting command representing an instruction to turn off the four indicator LEDs 67 and transmits the lighting command to the right controller 4.

In the independent operation mode, when the end condition to be described below is satisfied, the ring-shaped extension apparatus 5 executes the process of ending the independent operation mode (hereinafter referred to as the "ending process"). Specifically, when ending the independent operation mode, the ring-shaped extension apparatus 5 first causes the right controller 4 to output a notification sound that notifies of the end of the independent operation mode. That is, the ring-shaped extension apparatus 5 generates an output command representing an instruction to output the notification sound and transmits the output command to the right controller 4. Next, the ring-shaped extension apparatus 5 transmits an end signal representing the end of the independent operation mode to the right controller 4 after the ring-shaped extension apparatus 5 is ready to end the independent operation mode (e.g., after completing the process of rewriting data to the memory, etc.). As is the transmission request signal, the end signal may be in a command format or may be of any content that can be distinguished from other signals. The right controller 4 outputs the notification sound in response to receiving the output command from the ring-shaped extension apparatus 5, and ends the independent operation mode in response to receiving the end signal. On the other hand, the ring-shaped extension apparatus 5 having transmitted the end signal ends the independent operation mode. When the independent operation mode is ended, the right controller 4 enters the sleep mode. Therefore, in response to the ending of the independent operation mode, the power supply from the right controller 4 to the ring-shaped extension apparatus 5 is stopped.

In the present embodiment, the end condition includes three conditions as follows.

(Condition A) A predetermined end operation has been performed.

(Condition B) An input on the home button 58 of the right controller 4 has been detected.

(Condition C) No operation on the ring-shaped extension apparatus 5 has continuously been detected for a predetermined amount of time (e.g., 1 min).

When any of Condition A to Condition C is satisfied, the ring-shaped extension apparatus 5 executes the ending process.

Regarding Condition A, the ring-shaped extension apparatus 5 executes the ending process in response to a predetermined end operation. In the present embodiment, the end operation is an operation of pressing down the analog stick 52, as is the start operation described above. Note however that in other embodiments, the end operation may be any operation. Note that when the end operation is detected, the right controller 4 does not end the independent operation mode at this point, but transmits controller data indicating that the end operation has been performed in response to the transmission request signal from the ring-shaped extension apparatus 5. Then, the ring-shaped extension apparatus 5 having received the controller data indicating that the end operation has been performed executes the process of ending the independent operation mode, thereby transmitting the end signal from the ring-shaped extension apparatus 5 to the right controller 4. The right controller 4 ends the independent operation mode in response to receiving this end signal.

Regarding Condition B, the ring-shaped extension apparatus 5 executes the ending process in response to an input on the home button 58 of the right controller 4. Herein, when an input on the home button 58 is detected while not in the independent operation mode, the right controller 4 transmits, to the main body apparatus 2, the resume signal for causing the main body apparatus 2 to resume from the sleep mode, as described above, and then executes the communication process. In contrast, when an input on the home button 58 is detected in the independent operation mode, the right controller 4 transmits controller data indicating that an input on the home button 58 has been performed in response to the transmission request signal from the ring-shaped extension apparatus 5. Then, the ring-shaped extension apparatus 5, having received controller data indicating that an input on the home button 58 has been performed, executes the ending process. In the ending process, the ring-shaped extension apparatus 5 transmits, to the right controller 4, a resume instruction command that instructs to transmit a resume signal, together with the end signal, to the main body apparatus 2. The right controller 4, having received the resume instruction command, ends the independent operation mode in accordance with the end signal, and then transmits the resume signal to the main body apparatus 2. Then, also when an input on the wake button is performed in the independent operation mode, the right controller 4 can perform a similar operation to that when an input on the wake button is performed while not in the independent operation mode.

Note that in other embodiments, the right controller 4 may end the independent operation mode after transmitting the resume signal to the main body apparatus 2. Then, there will be moments where the right controller 4 and the main body apparatus 2 wirelessly communicate with each other while in the independent operation mode. Note that at the point when the right controller 4 transmits the resume signal to the main body apparatus 2, the process in the independent operation mode is already completed on the ring-shaped extension apparatus 5, and it can be said that the operation in the independent operation mode is substantially ended. Therefore, it is believed that there will be no problems even if the main body apparatus 2 and the right controller 4 communicate with each other in the independent operation mode.

As described above, in the present embodiment, when a peripheral apparatus (herein, the ring-shaped extension apparatus 5) receives controller data that is transmitted in response to an input on a wake button (e.g., the home button 58) having been performed in the independent operation mode, the peripheral apparatus generates a command instructing to transmit, to the main body apparatus 2, a signal configured to cause the main body apparatus 2 to resume from the sleep mode and transmits the command to the right controller 4. In response to receiving the command from the peripheral apparatus, the right controller 4 transmits, to the main body apparatus 2, a signal configured to cause the main body apparatus 2 to resume from the sleep mode. According to the description above, the right controller 4 does not perform special processes that are different from normal processes in the independent operation mode (i.e., the processes performed by the right controller 4 in accordance with commands from the peripheral apparatus), but can operate in substantially the same manner while in the independent operation mode and while not in the independent operation mode. According to the description above, since the right controller 4 does not need to execute special processes in the independent operation mode, it is possible to simplify the process of the right controller 4 in the independent operation mode.

Regarding Condition C, when no operation on the ring-shaped extension apparatus 5 has continuously been detected for a predetermined amount of time (e.g., 1 min), the ring-shaped extension apparatus 5 executes the ending process. Herein, the phrase "no operation on the ring-shaped extension apparatus 5 has continuously been detected for a predetermined amount of time" means that the state where the amount of deformation of the ring-shaped extension apparatus 5 is nearly 0 (this does not strictly need to be 0) continues for a predetermined amount of time. In such a case, it can be assumed that the user has no intention of performing a fitness exercise operation using the ring-shaped extension apparatus 5, and therefore the ring-shaped extension apparatus 5 ends the independent operation mode.

As described above, in the present embodiment, when a peripheral apparatus (herein, the ring-shaped extension apparatus 5) receives controller data that is transmitted in response to a predetermined input using the right controller 4 (the end operation or an input on the home button 58) having been performed in the independent operation mode, the peripheral apparatus transmits, to the right controller 4, an end signal representing the end of the independent operation mode.

If the right controller 4 were to transmit the end signal to the ring-shaped extension apparatus 5, it might be possible that the right controller 4 transmits the end signal while some process is being executed on the peripheral apparatus. Then, since the right controller 4 stops the power supply to the peripheral apparatus after ending the independent operation mode, it may be possible that the power supply from the right controller 4 is stopped while some process is being executed on the peripheral apparatus. In such a case, the process on the peripheral apparatus may not end normally, thereby causing a problem in the process in the independent operation mode. For example, if the power supply from the right controller 4 is stopped while a process of writing on a memory of the peripheral apparatus is being executed, the data stored in the memory may be deleted.

In contrast, in the present embodiment, since the ring-shaped extension apparatus 5 transmits the end signal to the right controller 4, the peripheral apparatus can transmit the end signal at an appropriate timing after the completion of the process on the peripheral apparatus, and end the independent operation mode. Then, the power supply from the right controller 4 is stopped after the completion of the process. Therefore, according to the present embodiment, it is possible to reduce the possibility of discontinuing an unfinished process on the peripheral apparatus when ending the independent operation mode, and it is therefore possible to safely end the independent operation mode.

3. Specific Example of Information Processes on Game System

Figure 14:
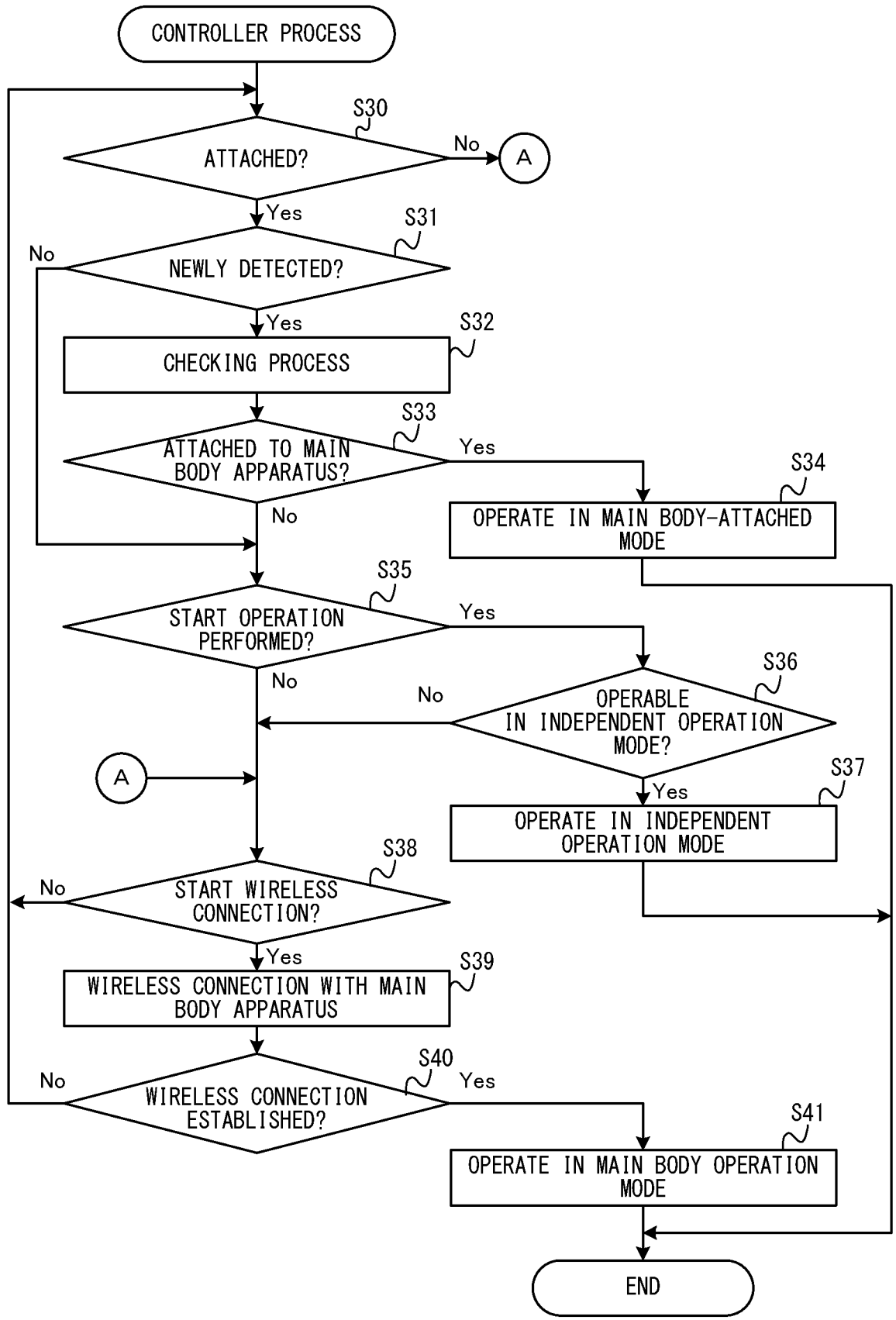
FIG. 14 is a flow chart showing an example of a controller process executed by the non-limiting right controller 4.

Next, a specific example of processes executed on the right controller 4 and the ring-shaped extension apparatus 5 will be described. FIG. 14 is a flow chart showing an example of a controller process executed by the right controller 4. The series of controller processes shown in FIG. 14 is for determining the mode of operation, and is started in response to the resumption of the right controller 4 from the sleep mode.

Note that in the present embodiment, it is assumed that the processor of the communication control section 111 of the right controller 4 executes a firmware program stored in the memory 112 to execute the processes of the steps shown in FIG. 14. Note however that in other embodiments, some of the processes of the steps may be executed by another processor (e.g., a dedicated circuit, etc.) different from the processor of the communication control section 111. The processes of the steps shown in FIG. 14 are merely illustrative, and the order of steps to be performed may be switched around or other processes may be executed in addition to (or instead of) the processes of the steps, as long as similar results are obtained.

The communication control section 111 executes the processes of the steps shown in FIG. 14 by using the memory 112. That is, the communication control section 111 stores information (in other words, data) obtained in each process step in the memory 112 and reads out the information from the memory 112 to use the information in a subsequent process step.

When the controller process is started, in step S30, the processor first determines whether or not the right controller 4 is attached to another apparatus (a peripheral apparatus or the main body apparatus 2). When the determination result from step S30 is affirmative, the process of step S31 is executed. On the other hand, when the determination result from step S30 is negative, the process of step S38 to be described below is executed.

Note that in other embodiments, the determination process of step S30 may be performed in the checking process described above. That is, when no checking electronic component is detected as a result of executing the checking process, the processor may determine that the right controller 4 is not attached to another apparatus. Note that in this variation, the checking process of step S32 to be described below may be omitted.

In step S31, the processor determines whether or not it has newly been detected that the right controller 4 is connected to another apparatus. That is, in step S31, the determination result is negative if the right controller 4 is already attached to another apparatus. When the determination result from step S31 is affirmative, the process of step S32 is executed. On the other hand, when the determination result from step S31 is negative, the process of step S35 to be described below is executed.

In step S32, the processor executes the checking process described above (step S21 shown in FIG. 13). Through the checking process, the processor can determine the type of the apparatus to which the right controller 4 is attached (specifically, whether it is a peripheral apparatus that is compatible with the independent operation mode or the main body apparatus 2). The process of step S33 is executed following step S32. Note that in other embodiments, as the type of the apparatus to which the right controller 4 is attached, the processor may determine that the apparatus is a peripheral apparatus that is not compatible with the independent operation mode or a peripheral apparatus that is compatible with another mode.

In step S33, the processor determines whether or not the right controller 4 is attached to the main body apparatus 2 based on the result of the checking process. When the determination result from step S33 is affirmative, the process of step S34 is executed. On the other hand, when the determination result from step S33 is negative (that is, when the right controller 4 is attached to the peripheral apparatus), the process of step S35 to be described below is executed.

In step S34, the processor starts operating in the main body-attached mode. While in the main body-attached mode, the processor executes processes in accordance with various signals (specifically, the transmission request signal and the end signal, etc.) or commands received from the main body apparatus 2 via the terminal 64. When the operation in the main body-attached mode is completed, the processor ends the controller process shown in FIG. 14 and puts the right controller 4 to the sleep mode. For example, when the main body apparatus 2 enters the sleep mode in response to an instruction from the user, the main body apparatus 2 transmits the end signal to the right controller 4, as in the main body operation mode. When the end signal is received, the processor ends the operation in the main body-attached mode, and the right controller 4 enters the sleep mode.

On the other hand, in step S35, the processor determines whether or not the start operation has been performed. That is, the processor determines whether or not the operation of pressing down the analog stick 52 has been detected. Note that in the process of step S35, which is executed as a result of the determination result from step S30 becoming affirmative immediately after the right controller 4 resumes from the sleep mode, the processor determines whether or not the right controller 4 has resumed from the sleep mode in response to the detection of the operation of pressing down the analog stick 52. When the determination result from step S35 is affirmative, the process of step S36 is executed. On the other hand, when the determination result from step S35 is negative, the process of step S38 to be described below is executed.

In step S36, the processor determines whether or not the peripheral apparatus to which the right controller 4 is attached is capable of operating in the independent operation mode. That is, the processor determines whether or not the peripheral apparatus to which the right controller 4 is attached is a peripheral apparatus that is compatible with the independent operation mode based on the result of the checking process. Then, when it is a peripheral apparatus that is compatible with the independent operation mode, the power supply to the peripheral apparatus is started (step S22 shown in FIG. 13), and mode information representing the independent operation mode is transmitted to the peripheral apparatus (step S24 shown in FIG. 13). Moreover, when there is a response to the mode information from the peripheral apparatus, the processor determines that the peripheral apparatus to which the right controller 4 is attached is capable of operating in the independent operation mode. On the other hand, when the peripheral apparatus to which the right controller 4 is attached is not compatible with the independent operation mode, or when there is no response from the peripheral apparatus, the processor determines that the peripheral apparatus to which the right controller 4 is attached is not capable of operating in the independent operation mode. When the determination result from step S36 is affirmative, the process of step S37 is executed. On the other hand, when the determination result from step S36 is negative, the process of step S38 to be described below is executed.

In step S37, the processor starts operating in the independent operation mode. While in the independent operation mode, the processor executes processes in accordance with various signals or commands received from a peripheral apparatus (herein, the ring-shaped extension apparatus 5) via the terminal 64 (see FIG. 12). When the operation in the independent operation mode is completed, the processor ends the controller process shown in FIG. 14, entering the sleep mode. Note that when the independent operation mode is ended, the end signal is transmitted from the ring-shaped extension apparatus 5 to the right controller as described above. When the end signal is received, the processor ends the operation in the independent operation mode, and the right controller 4 enters the sleep mode.

On the other hand, in step S38, the processor determines whether or not to start the wireless connection with the main body apparatus 2. That is, the processor determines whether or not an input on an operation section of the right controller 4 (e.g., the buttons 113 and the analog stick 52) has been detected. Note that in the present embodiment, the right controller 4 resumes from the sleep mode in response to an input on an operation section. Therefore, when the process of step S38 is executed as a result of the determination result from step S30 becoming negative immediately after the right controller 4 resumes from the sleep mode, the processor determines that the input has been detected. When the determination result from step S38 is affirmative, the process of step S39 is executed. On the other hand, when the determination result from step S38 is negative, the process of step S30 is executed again.

In step S39, the processor executes the communication process for establishing the wireless connection between the right controller 4 and the main body apparatus 2. The process of step S40 is executed following step S39.

In step S40, the processor determines whether or not the wireless connection between the right controller 4 and the main body apparatus 2 has been established. When the determination result from step S40 is affirmative, the process of step S41 is executed. On the other hand, when the determination result from step S40 is negative, the process of step S30 is executed again. Note that in this case, the processes of steps S30, S35, S38 to S40 are repeatedly executed while the right controller 4 is not attached to another apparatus, and in response to the establishment of the wireless connection between the right controller 4 and the main body apparatus 2, the determination result from step S40 becomes affirmative and the process of step S41 is executed.

In step S41, the processor starts operating in the main body operation mode. While in the main body operation mode, the processor executes the process shown in FIG. 11 to generate various signals and/or commands, and transmits the signals and/or commands to the peripheral apparatus via the terminal 64 or wirelessly transmits the controller data and the ring operation data to the main body apparatus 2. Note that although not shown in the figures, when the right controller 4 is attached to the ring-shaped extension apparatus 5 during the process of step S41 (i.e., when the right controller 4 operating in the main body operation mode is attached to the ring-shaped extension apparatus 5), the series of processes of steps S21, S22 and S24 is executed during the process of step S41. When the operation in the main body operation mode is completed, the processor ends the controller process shown in FIG. 14, entering the sleep mode. For example, when the main body apparatus 2 enters the sleep mode in response to an instruction from the user, the main body apparatus 2 transmits, to the right controller 4, the end signal configured to cause the right controller 4 to end the operation in the main body operation mode. When the end signal is received, the processor ends the operation in the main body operation mode, and the right controller 4 enters the sleep mode.

Note that when no operation is performed using the right controller 4 for a predetermined amount of time (e.g., 1 min) while the controller process shown in FIG. 14 is being executed, the right controller 4 may end the controller process and enter the sleep mode.

Figure 15:
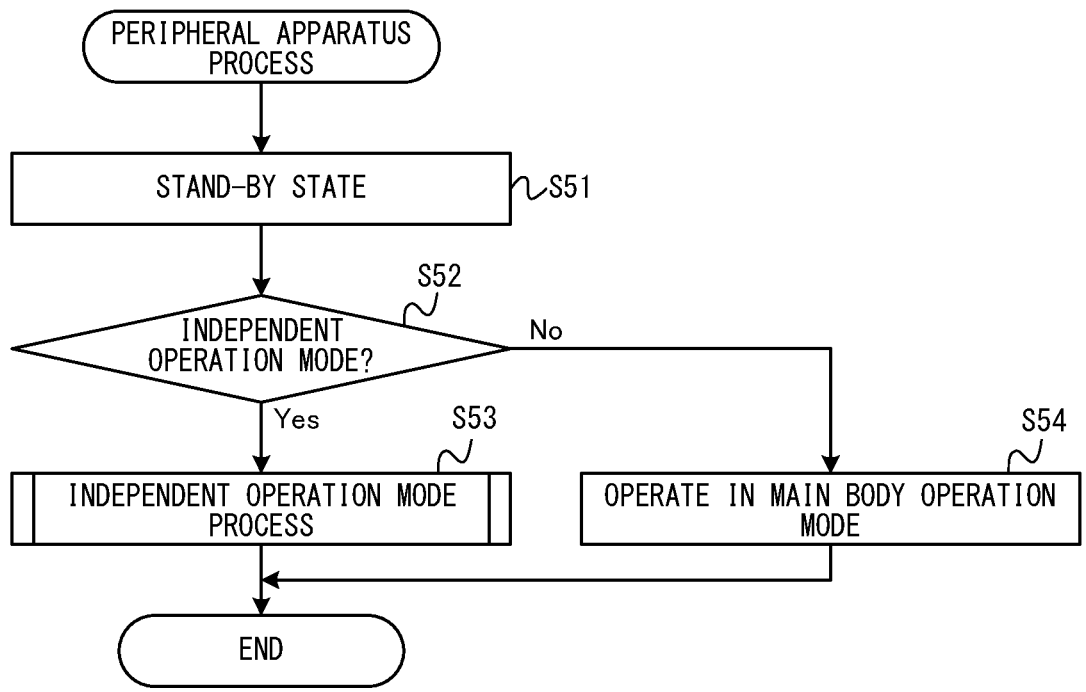
FIG. 15 is a flow chart showing an example of a peripheral apparatus process executed by the non-limiting ring-shaped extension apparatus 5.
Figure 16:
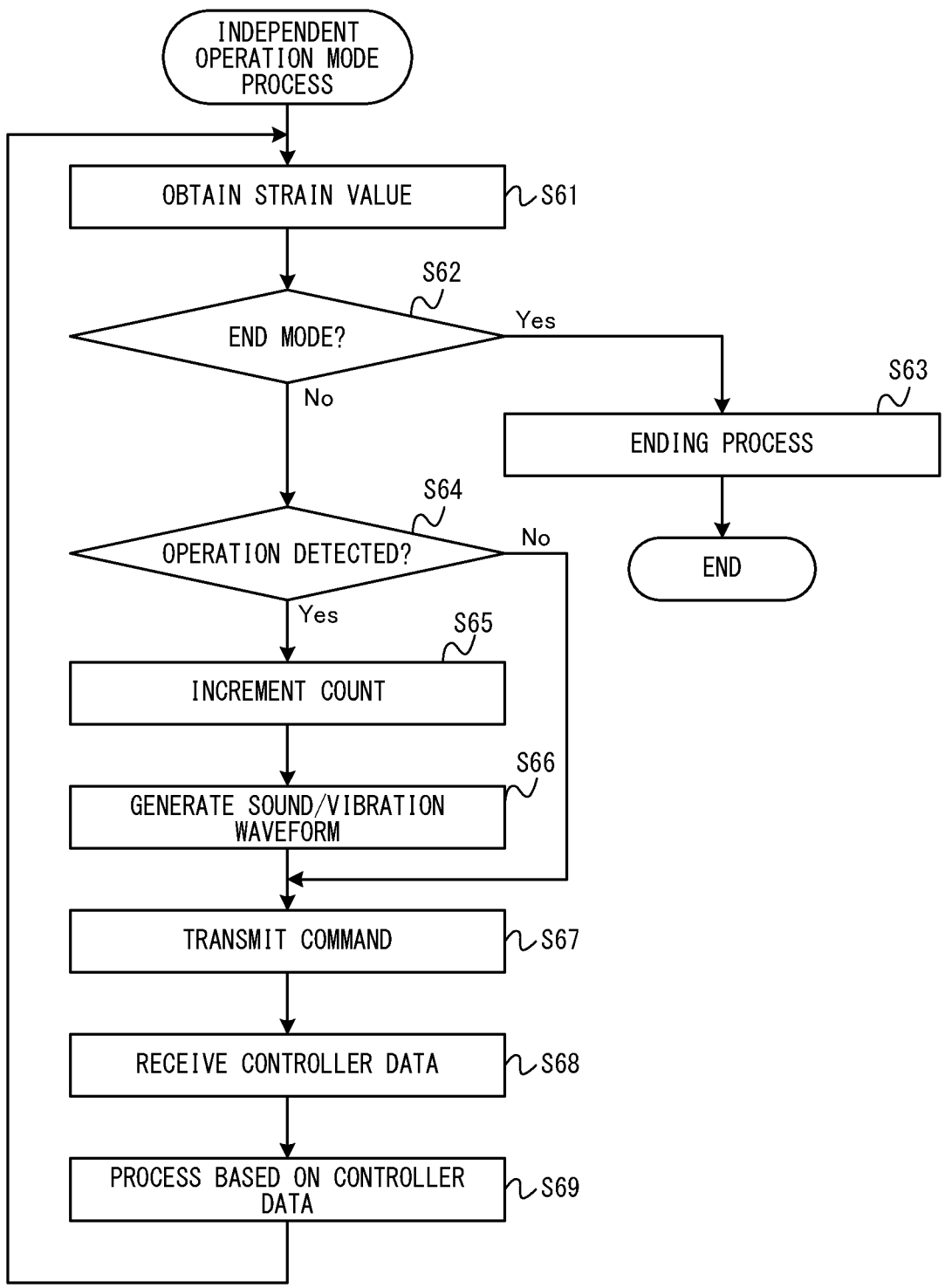
FIG. 16 is a sub-flow chart showing an example of a detailed flow of an independent operation mode process of step S53 shown in FIG. 15.

FIG. 15 and FIG. 16 are flow charts showing an example of peripheral apparatus processes executed by the ring-shaped extension apparatus 5. The series of peripheral apparatus processes shown in FIG. 15 and FIG. 16 is started in response to the start-up of the ring-shaped extension apparatus 5 following the start of the power supply from the right controller 4, for example.

Note that in the present embodiment, it is assumed that the processes of the steps shown in FIG. 15 and FIG. 16 are executed by the processor of the control section 213 of the ring-shaped extension apparatus 5 executing a program stored in the memory of the control section 213. Note however that in other embodiments, some of the processes of the steps may be executed by another processor (e.g., a dedicated circuit, etc.) different from the processor of the control section 213. The processes of the steps shown in FIG. 15 and FIG. 16 are merely illustrative, and the order of steps to be performed may be switched around or other processes may be executed in addition to (or instead of) the processes of the steps, as long as similar results are obtained.

The control section 213 executes the processes of the steps shown in FIG. 15 and FIG. 16 using the memory. That is, the control section 213 stores information (in other words, data) obtained in each process step in the memory and reads out the information from the memory to user the information in a subsequent process step.

When the peripheral apparatus process is started, in step S51, the processor first enters the stand-by state as described above. Then, in response to the ring-shaped extension apparatus 5 receiving the mode information from the right controller 4, the process of step S52 is executed.

In step S52, the processor determines whether or not to operate in the independent operation mode. That is, the processor determines whether or not the mode information received from the right controller 4 represents the independent operation mode. When the determination result from step S52 is affirmative, the process of step S53 is executed. On the other hand, when the determination result from step S52 is negative, the process of step S54 to be described below is executed.

In step S53, the processor executes an independent operation mode process, which is a process to be performed while in the independent operation mode. The independent operation mode process will be described below (see FIG. 16). After the end of the independent operation mode process, the processor ends the peripheral apparatus process. Then, the power supply from the right controller 4 to the ring-shaped extension apparatus 5 is stopped.

On the other hand, in step S54, the processor starts operating in the main body operation mode. That is, the processor executes a process in accordance with a signal or a command received from the right controller 4 via the terminal 214 (see FIG. 11). After the end of the main body operation mode process, the processor ends the peripheral apparatus process. Then, the power supply from the right controller 4 to the ring-shaped extension apparatus 5 is stopped.

FIG. 16 is a sub-flow chart showing an example of a detailed flow of the independent operation mode process of step S53 shown in FIG. 15. In the independent operation mode process, in step S61, the processor first obtains the strain value detected by the strain detector 211. The process of step S62 is executed following step S61.

In step S62, the processor determines whether or not to end the independent operation mode. That is, the processor determines whether or not any of the end conditions described in "[2-4. Specific example of processes in independent operation mode]" above has been satisfied. Specifically, when controller data indicating that the end operation has been performed is received in step S68 to be described below, it is determined in subsequent step S62 that Condition A has been satisfied. When controller data indicating that an input on the home button 58 has been performed is received in step S68 to be described below, it is determined in subsequent step S62 that Condition B has been satisfied. When the strain values obtained in step S61, which is repeatedly executed, indicate that no operation on the ring-shaped extension apparatus 5 has continuously been detected for a predetermined amount of time, it is determined in subsequent step S62 that Condition C has been satisfied. When the determination result from step S62 is affirmative, the process of step S63 is executed. On the other hand, when the determination result from step S62 is negative, the process of step S64 to be described below is executed.

In step S63, the processor executes the ending process described above. Then, the processor ends the independent operation mode process.

On the other hand, in step S64, the processor determines whether or not a push-in operation or a pull operation on the ring-shaped extension apparatus 5 has been detected. Note that the detection of a push-in operation or a pull operation is performed in accordance with the method described in "[2-4. Specific example of processes in independent operation mode]" above based on the strain value obtained in step S61. When the determination result from step S64 is affirmative, the process of step S65 is executed. On the other hand, when the determination result from step S64 is negative, the process of step S67 to be described below is executed, skipping the processes of steps S65 and S66.

In step S65, the processor keeps the count of operations that have been performed on the ring-shaped extension apparatus 5. Specifically, the processor updates the value stored in the memory as the operation count by incrementing the value. The process of step S66 is executed following step S65.

In step S66, the processor generates a waveform of a sound and a vibration. That is, the processor generates data specifying a waveform of a sound and a vibration to be input to the vibrator 117 of the right controller 4. Note that when the setting has been switched so as to turn OFF the sound output or the setting has been switched so as to turn OFF the vibration output, as described above, the processor does not generate a waveform of a sound and/or a vibration in accordance with the setting. The process of step S67 is executed following step S66.

In step S67, the processor transmits a signal and a command to the right controller 4. Specifically, the processor generates the end signal, the output command, the lighting command and the resume instruction command, as necessary, as well as the transmission request signal described above. Then, the processor transmits the generated signal and the generated command to the right controller 4 via the terminal 214. The process of step S68 is executed following step S67.

In step S68, the processor receives controller data from the right controller 4. When the transmission request signal is transmitted to the right controller 4 through the process of step S67, the controller data is transmitted from the right controller 4 in response to receiving the transmission request signal, and the processor receives the controller data via the terminal 214. The process of step S69 is executed following step S68.

In step S69, the processor executes a process based on the controller data received in step S68. Specifically, as described in "[2-4. Specific example of processes in independent operation mode]" above, when controller data indicating that a sound switching operation or a vibration switching operation has been performed is received, the sound and vibration setting is changed. Note that information representing the setting is stored in the memory of the control section 213. The process of step S61 is executed again following step S69. Thereafter, the process loop of steps S61, S62, S64 to S69 is repeatedly executed until it is determined in step S62 to end the independent operation mode.

Note that in the present embodiment, the processor repeatedly executes the process loop at the rate of once per a predetermined amount of time. That is, the ring-shaped extension apparatus 5 periodically transmits the transmission request signal to the right controller 4 at this rate. Note that in other embodiments, the ring-shaped extension apparatus 5 does not need to periodically transmit the transmission request signal. For example, when there is no need to transmit the transmission request signal in the process loop, the ring-shaped extension apparatus 5 may skip the process of step S67. For example, the ring-shaped extension apparatus 5 may periodically transmit a command to the right controller 4, and transmit a command that instructs to perform no operation to the right controller 4 when there is nothing to instruct to the right controller 4.

4. Functions/Effects and Variations of Present Embodiment

In the embodiment described above, a peripheral apparatus (e.g., the ring-shaped extension apparatus 5) is capable of communicating with a game controller (e.g., the right controller 4) with which it is possible to control a game apparatus (e.g., the main body apparatus 2). A peripheral apparatus includes a sensor (e.g., the strain detector 211) detecting a user input, a processing section (e.g., the control section 213 executing the process of generating commands), and a transmitter (e.g., the control section 213 transmitting commands or terminal 214). The peripheral apparatus, while the communication connection with the game controller is established, is capable of operating in one of a plurality of modes, including a first mode (e.g., the independent operation mode) and a second mode (e.g., the main body operation mode). In the first mode, the processing section generates a command (e.g., the output command) instructing the game controller to execute a predetermined operation based on peripheral apparatus data (e.g., data representing the strain value) in accordance with a user input detected by the sensor, and the transmitter transmits the command to the game controller. In the second mode, the transmitter transmits the peripheral apparatus data to the game controller.

With such a configuration, in the first mode, the game controller can operate in accordance with the command from the peripheral apparatus. Therefore, the process of the game controller in the first mode can be a general-purpose process so that the game controller is easily compatible with different types of peripheral apparatuses. Therefore, according to the present embodiment, the game controller is easily compatible with a wider variety of peripheral apparatuses. Moreover, it is possible to simplify the process of the game controller in the first mode, and it is therefore possible to reduce the amount of programs and data to be stored in the right controller 4 for executing the process.

In the embodiment described above, the game controller can control the game apparatus and can communicate with the peripheral apparatus. The game controller includes operation sections (e.g., the buttons 113 and the analog stick 52) and a transmitter (e.g., the communication control section). The game controller, while the communication connection with the peripheral apparatus is established, is capable of operating in one of a plurality of modes including the first mode and the second mode. In the first mode, the transmitter transmits, to the peripheral apparatus, controller data in accordance with a user input to an operation section. In the second mode, the transmitter transmits, to the game apparatus, controller data in accordance with a user input to an operation section.

With such a configuration, in the first mode, the game controller transmits controller data to the peripheral apparatus. Then, since a process based on a user input to the game controller can be executed on the peripheral apparatus side, and for this process, the game controller only needs to transmit controller data, and the process of the game controller in the first mode can be a general-purpose process. It is also possible to simplify the process of the game controller in the first mode.

(Variation Regarding Connection Between Game Controller and Peripheral Apparatus)

In the embodiment described above, by attaching the game controller (e.g., the right controller 4) and the peripheral apparatus (e.g., the ring-shaped extension apparatus 5) to each other, they are electrically connected to each other, thereby enabling communication therebetween. In other embodiments, the game controller and the peripheral apparatus may not be capable of being attached to each other. For example, in other embodiments, the game controller and the peripheral apparatus may be electrically connected to each other via a cable, thereby enabling communication therebetween. In other embodiments, the game controller and the peripheral apparatus may communicate with each other in wireless communication. Note that a state where the communication connection between the game controller and the peripheral apparatus is established refers to a state where they are electrically connected to each other in the case of wired communication, and refers to a state where a wireless connection is established therebetween in the case of wireless communication.

(Variation Regarding Configuration of Peripheral Apparatus)

In the embodiment described above, the ring-shaped extension apparatus 5, which is an example of the peripheral apparatus, includes a sensor (e.g., the strain detector 211) that outputs data in accordance with a user input. Herein, in other embodiments, the peripheral apparatus may be any apparatus that is capable of communicating with the game controller, and does not need to include the sensor. For example, the peripheral apparatus may be an apparatus that does not include the sensor but includes operation buttons and/or analog stick. For example, the peripheral apparatus may be an apparatus that does not include operation sections but includes the processing section and the storage medium for executing the process in the independent operation mode.

Note that in the main body operation mode, the peripheral apparatus may transmit peripheral apparatus data obtained or generated by the peripheral apparatus to a game controller in response to a request from the game controller. The peripheral apparatus data may be data obtained by the peripheral apparatus such as the ring operation data of the embodiment described above (e.g., data obtained from the sensor or the operation sections of the peripheral apparatus), or may be data generated by the peripheral apparatus (e.g., data generated by the process executed on the peripheral apparatus).

Note that while the right controller 4 is attached to the peripheral apparatus in the embodiment described above, the left controller 3 can also operate in similar modes to those of the right controller 4 (i.e., the main body operation mode, the independent operation mode and the main body-attached mode). In other embodiments, the peripheral apparatus may be an apparatus to which the left controller 3 is attached.

The embodiment described above is applicable to a peripheral apparatus capable of communicating with a game controller, for example, with the aim of minimizing the need to make changes to the game controller so that the game controller is compatible with the peripheral apparatus.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A peripheral apparatus configured to communicate with a game controller configured to control a game apparatus, the peripheral apparatus comprising a sensor configured to detect a user input, a processor and a transmitter, wherein:
    the peripheral apparatus is configured to operate in one of a plurality of modes including a first mode and a second mode while a communication connection between the peripheral apparatus and the game controller is established;
    in the first mode,
        the processor generates a command configured to cause the game controller to execute an operation based on peripheral apparatus data in accordance with a user input detected by the sensor; and
        the transmitter transmits the command to the game controller; and
    in the second mode,
        the transmitter transmits the peripheral apparatus data to the game controller.

2. The peripheral apparatus according to claim 1, wherein:
    in the first mode, a process based on a user input to the game controller and/or the peripheral apparatus is executed by the peripheral apparatus and the game controller without the game apparatus; and
    in the second mode, data based on the peripheral apparatus data is transmitted from the game controller to the game apparatus, and a process based on the transmitted data is executed by the game apparatus.

3. The peripheral apparatus according to claim 1, wherein in the first mode, the peripheral apparatus receives, from the game controller, controller data in accordance with a user input to the game controller.

4. The peripheral apparatus according to claim 3, wherein: in the first mode,
    the processor generates, based on the controller data, a command configured to cause the game controller to execute an operation; and
    the transmitter transmits the command to the game controller.

5. The peripheral apparatus according to claim 3, wherein the peripheral apparatus receives, from the game controller, controller data for all operable ones of buttons of the game controller.

6. The peripheral apparatus according to claim 3, wherein the transmitter transmits, to the game controller, the command, which is based on a portion of the controller data and not on the other portion of the controller data.

7. The peripheral apparatus according to claim 1, wherein:
    the game controller includes a wake button;
    when an input on the wake button is detected while a communication connection between the game controller and the peripheral apparatus is not established in a state that is at least different from a state of operating in the first mode, the game controller transmits, to the game apparatus, a signal configured to cause the game apparatus to resume from a sleep mode, wherein the transmission is not based on the command from the peripheral apparatus; and
    in the first mode, when the peripheral apparatus receives controller data that is transmitted in response to an input on the wake button having been performed, the processor generates a command instructing to transmit, to the game apparatus, a signal configured to cause the game apparatus to resume from the sleep mode, and the transmitter transmits the command to the game controller.

8. The peripheral apparatus according to claim 1, wherein:
    the peripheral apparatus is electrically connectable to the game controller and configured to be powered by power supplied from the game controller electrically connected to the peripheral apparatus;
    when the peripheral apparatus starts up based on power supplied from the game controller, the peripheral apparatus enters a stand-by state waiting for receiving, from the game controller, mode information indicating one of the plurality of modes in which the peripheral apparatus should operate; and
    the peripheral apparatus operates in the mode indicated by the mode information received from the game controller in the stand-by state.

9. The peripheral apparatus according to claim 8, wherein the peripheral apparatus includes an electronic component that is a part of a circuit formed through electrical connection between the game controller and the peripheral apparatus and has a resistance value.

10. The peripheral apparatus according to claim 9, wherein in the first mode, when the peripheral apparatus receives controller data that is transmitted in response to an input using the game controller having been performed, the transmitter transmits an end signal representing an end of the first mode to the game controller.

11. The peripheral apparatus according to claim 1, further comprising a storage medium configured to store the number of user inputs detected by the sensor in the first mode.

12. A peripheral apparatus configured to communicate with a game controller configured to control a game apparatus, the peripheral apparatus comprising a processor and a transmitter, wherein:
    the peripheral apparatus is configured to operate in one of a plurality of modes including a first mode and a second mode while a communication connection between the peripheral apparatus and the game controller is established;

in the first mode,
the transmitter transmits a transmission request signal to the game controller; and
the processor executes a process based on controller data in accordance with a user input to the game controller, wherein the controller data is transmitted from the game controller in response to the game controller receiving the transmission request signal; and in the second mode,
in response to a transmission request signal from the game controller, the transmitter transmits, to the game controller, peripheral apparatus data obtained or generated by the peripheral apparatus.

13. The peripheral apparatus according to claim 12, wherein:
in the first mode, a process based on a user input to the game controller and/or the peripheral apparatus is executed by the peripheral apparatus and the game controller without the game apparatus; and
in the second mode, data based on the peripheral apparatus data is transmitted from the game controller to the game apparatus, and a process based on the transmitted data is executed by the game apparatus.

14. The peripheral apparatus according to claim 12, wherein in the first mode, the peripheral apparatus receives, from the game controller, controller data in accordance with a user input to the game controller.

15. The peripheral apparatus according to claim 14, wherein
in the first mode,
the processor generates, based on the controller data, a command configured to cause the game controller to execute an operation; and
the transmitter transmits the command to the game controller.

16. The peripheral apparatus according to claim 14, wherein the peripheral apparatus receives, from the game controller, controller data for all operable ones of buttons of the game controller.

17. The peripheral apparatus according to claim 14, wherein the transmitter transmits, to the game controller, the command, which is based on a portion of the controller data and not on the other portion of the controller data.

18. The peripheral apparatus according to claim 12, wherein:
the game controller includes a wake button;
when an input on the wake button is detected while a communication connection between the game controller and the peripheral apparatus is not established in a state that is at least different from a state of operating in the first mode, the game controller transmits, to the game apparatus, a signal configured to cause the game apparatus to resume from a sleep mode, wherein the transmission is not based on the command from the peripheral apparatus; and
in the first mode, when the peripheral apparatus receives controller data that is transmitted in response to an input on the wake button having been performed, the processor generates a command instructing to transmit, to the game apparatus, a signal configured to cause the game apparatus to resume from the sleep mode, and the transmitter transmits the command to the game controller.

19. The peripheral apparatus according to claim 12, wherein:
the peripheral apparatus is electrically connectable to the game controller and configured to be powered by power supplied from the game controller electrically connected to the peripheral apparatus;
when the peripheral apparatus starts up based on power supplied from the game controller, the peripheral apparatus enters a stand-by state waiting for receiving, from the game controller, mode information indicating one of the plurality of modes in which the peripheral apparatus should operate; and
the peripheral apparatus operates in the mode indicated by the mode information received from the game controller in the stand-by state.

20. The peripheral apparatus according to claim 19, wherein the peripheral apparatus includes an electronic component that is a part of a circuit formed through electrical connection between the game controller and the peripheral apparatus and has a resistance value.

21. The peripheral apparatus according to claim 19, wherein in the first mode, when the peripheral apparatus receives controller data that is transmitted in response to an input using the game controller having been performed, the transmitter transmits an end signal representing an end of the first mode to the game controller.

22. A game controller configured to control a game apparatus and configured to communicate with a peripheral apparatus, the game controller including an operation device and a transmitter, wherein:
the game controller is configured to operate in one of a plurality of modes including a first mode and a second mode while a communication connection between the game controller and the peripheral apparatus is established;
in the first mode, the transmitter transmits, to the peripheral apparatus, controller data in accordance with a user input to the operation device; and
in the second mode, the transmitter transmits, to the game apparatus, controller data in accordance with a user input to the operation device.

23. The game controller according to claim 22, wherein:
in the first mode, a process based on a user input to the game controller and/or the peripheral apparatus is executed by the peripheral apparatus and the game controller without the game apparatus; and
in the second mode, a process based on the controller data transmitted to the game apparatus is executed by the game apparatus.

24. The game controller according to claim 22, wherein:
in the first mode, the game controller receives, from the peripheral apparatus, a command in accordance with controller data transmitted to the peripheral apparatus, and operates in response to the command;
in the second mode, the game controller receives, from the game apparatus, a command in response to controller data transmitted to the game apparatus, and operates in response to the command.

25. The game controller according to claim 22, wherein:
the operation device includes buttons; and
the transmitter transmits, to the peripheral apparatus, controller data for all operable ones of buttons of the game controller.

26. The game controller according to claim 22, wherein:
the game controller includes a wake button;
when an input on the wake button is detected while a communication connection between the game controller and the peripheral apparatus is not established in a state that is at least different from a state of operating in the first mode, the game controller transmits, to the game apparatus, a signal configured to cause the game apparatus to resume from a sleep mode, wherein the transmission is not based on a command from the peripheral apparatus; and in response to the wake button being pressed in the first mode, the game controller transmits, to the peripheral apparatus, controller data that is transmitted in response to the wake button having been pressed, and in response to receiving a command in accordance with the controller data from the peripheral apparatus, the game controller transmits, to the game apparatus, a signal configured to cause the game apparatus to resume from the sleep mode.

27. The game controller according to claim 22, wherein:
when a resistance value of a circuit that is formed through electrical connection between the game controller and the peripheral apparatus is within a first range, the game controller is capable of operating in the first mode and is capable of operating in the second mode; and
when the resistance value of the circuit that is formed through electrical connection between the game controller and the peripheral apparatus is within a second range different from the first range, the game controller is capable of operating in the second mode and not in the first mode.

28. The game controller according to claim 27, wherein the game controller operates in the first mode, at least on the condition that the resistance value of the circuit that is formed through electrical connection between the game controller and the peripheral apparatus is within the first range, in response to detection of an input using the game controller in a state where the game controller is electrically connected to the peripheral apparatus and a wireless connection with the game apparatus has not been established.

29. The game controller according to claim 27, wherein at least on the condition that the resistance value of the circuit formed through electrical connection between the game controller and the peripheral apparatus is within the first range, the game controller supplies power to other parts of the peripheral apparatus different from a part thereof that forms the circuit.

30. The game controller according to claim 22, wherein when the game controller operates in the first mode, the processor generates mode information representing an operation in the first mode, and the transmitter transmits the mode information to the peripheral apparatus.

31. An information processing system comprising: a game controller configured to control a game apparatus; and a peripheral apparatus including a sensor configured to detect a user input, a processor and a transmitter, wherein:
the peripheral apparatus is configured to operate in one of a plurality of modes including a first mode and a second mode while a communication connection between the peripheral apparatus and the game controller is established;
in the first mode,
the processor generates, based on peripheral apparatus data in accordance with a user input detected by the sensor, a command configured to cause the game controller to execute an operation; and
the transmitter transmits the command to the game controller; and
the game controller operates in accordance with the command received from the peripheral apparatus; and
in the second mode,
the transmitter transmits the peripheral apparatus data to the game controller; and
the game controller receives the peripheral apparatus data from the peripheral apparatus.

32. An information processing method executed on an information processing system comprising: a game controller configured to control a game apparatus; and a peripheral apparatus including a sensor configured to detect a user input, a processor and a transmitter, wherein:
the peripheral apparatus is configured to operate in one of a plurality of modes including a first mode and a second mode while a communication connection between the peripheral apparatus and the game controller is established;
in the first mode,
the processor generates, based on peripheral apparatus data in accordance with a user input detected by the sensor, a command configured to cause the game controller to execute an operation; and
the transmitter transmits the command to the game controller; and
the game controller operates in accordance with the command received from the peripheral apparatus; and
in the second mode,
the transmitter transmits the peripheral apparatus data to the game controller; and
the game controller receives the peripheral apparatus data from the peripheral apparatus.

33. An information processing system comprising: a game controller configured to control a game apparatus; and a peripheral apparatus including a processor and a transmitter, wherein:
the peripheral apparatus is configured to operate in one of a plurality of modes including a first mode and a second mode while a communication connection between the peripheral apparatus and the game controller is established;
in the first mode,
the transmitter transmits a transmission request signal to the game controller;
in response to receiving the transmission request signal from the peripheral apparatus, the game controller transmits, to the peripheral apparatus, controller data in accordance with a user input to the game controller;
the processor executes a process based on the controller data received from the game controller; and
in the second mode,
in response to the transmission request signal from the game controller, the transmitter transmits, to the game controller, peripheral apparatus data obtained or generated by the peripheral apparatus; and
the game controller receives the peripheral apparatus data from the peripheral apparatus.

34. An information processing method executed on an information processing system comprising: a game controller configured to control a game apparatus; and a peripheral apparatus including a processor and a transmitter, wherein:
the peripheral apparatus is configured to operate in one of a plurality of modes including a first mode and a second mode while a communication connection between the peripheral apparatus and the game controller is established;

in the first mode, the transmitter transmits a transmission request signal to the game controller;

in response to receiving the transmission request signal from the peripheral apparatus, the game controller transmits, to the peripheral apparatus, controller data in accordance with a user input to the game controller;

the processor executes a process based on the controller data received from the game controller; and in the second mode, in response to the transmission request signal from the game controller, the transmitter transmits, to the game controller, peripheral apparatus data obtained or generated by the peripheral apparatus; and the game controller receives the peripheral apparatus data from the peripheral apparatus.

* * * * *